(12) United States Patent
Hashiguchi et al.

(10) Patent No.: US 12,053,888 B2
(45) Date of Patent: Aug. 6, 2024

(54) SUSPENDED ROBOT RECOVERY

(71) Applicant: KABUSHIKI KAISHA YASKAWA DENKI, Kitakyushu (JP)

(72) Inventors: Yukio Hashiguchi, Fukuoka (JP); Koichi Kuwahara, Fukuoka (JP)

( * ) Notice: Subject to any disclaimer, the term of this patent is extended or adjusted under 35 U.S.C. 154(b) by 367 days.

(21) Appl. No.: 17/525,959

(22) Filed: Nov. 15, 2021

(65) Prior Publication Data

US 2022/0072703 A1 Mar. 10, 2022

Related U.S. Application Data

(63) Continuation of application No. PCT/JP2019/019788, filed on May 17, 2019.

(51) Int. Cl.
*B25J 9/16* (2006.01)
(52) U.S. Cl.
CPC .......... *B25J 9/1653* (2013.01); *B25J 9/1666* (2013.01); *B25J 9/1671* (2013.01); *B25J 9/1676* (2013.01);
(Continued)
(58) Field of Classification Search
CPC ...... B25J 9/1653; B25J 9/1666; B25J 9/1671; B25J 9/1676; B25J 9/0093; B25J 9/0096; B25J 9/1605; B25J 9/1674; B25J 9/1664; B25J 19/0095; B25J 19/0066; B65H 67/065; G05B 2219/33309; G05B 2219/14115; G05B 2219/40164;
(Continued)

(56) References Cited

U.S. PATENT DOCUMENTS 5,825,655 A * 10/1998 Nakagawa ......... G05B 19/4067
700/192
6,212,444 B1 4/2001 Kato et al.
(Continued)

FOREIGN PATENT DOCUMENTS

CN 102317044 1/2012
CN 104339355 2/2015
(Continued)

OTHER PUBLICATIONS

JP 2018-51686 Translation (Year: 2016).*
(Continued)

*Primary Examiner* — Jaime Figueroa
*Assistant Examiner* — Benjamin J Brosh
(74) *Attorney, Agent, or Firm* — SOEI PATENT & LAW FIRM

(57) ABSTRACT

A robot system includes a robot; a peripheral device disposed around the robot; a control unit configured to operate at least the robot based on a program; a suspension unit configured to suspend a plurality of sequential operations performed by the robot in conjunction with the peripheral device based on an operation program if an irregular state occurs in the peripheral device; and a simulator. The simulator is configured to generate a recovery program based at least on a robot state information of the robot at the time of suspending the operation due to an occurrence of the irregular state, in which the control unit is further configured to cause the robot to operate with respect to the peripheral device based on the recovery program so that an operation by the suspended operation program becomes resumable.

20 Claims, 13 Drawing Sheets

(52) U.S. Cl.
CPC ............. *G05B 2219/40164* (2013.01); *G05B 2219/40204* (2013.01)

(58) Field of Classification Search
CPC .......... G05B 2219/40204; G05B 2219/40516; G05B 2219/40314
See application file for complete search history.

(56) References Cited

U.S. PATENT DOCUMENTS

| | | | |
|---|---|---|---|
| 9,446,517 | B2 | 9/2016 | Burns et al. |
| 2006/0009878 | A1 | 1/2006 | Kobayashi et al. |
| 2011/0288667 | A1 | 11/2011 | Noda et al. |
| 2012/0277909 | A1* | 11/2012 | Ouchi .................... B25J 9/1661 700/254 |
| 2015/0032244 | A1 | 1/2015 | Hashiguchi et al. |
| 2015/0032257 | A1* | 1/2015 | Hashiguchi ............ B25J 9/1674 901/14 |
| 2015/0253757 | A1 | 9/2015 | Ikeda |
| 2015/0266182 | A1 | 9/2015 | Strandberg |
| 2016/0263745 | A1 | 9/2016 | Shirahata |
| 2018/0059641 | A1* | 3/2018 | Morimoto .......... G05B 19/4062 |
| 2018/0117763 | A1 | 5/2018 | Nagasaki et al. |
| 2018/0281190 | A1 | 10/2018 | Kakisaka et al. |
| 2019/0008599 | A1 | 1/2019 | Lynch et al. |

FOREIGN PATENT DOCUMENTS

| | | |
|---|---|---|
| CN | 105690395 | 6/2016 |
| CN | 108289719 | 7/2018 |
| JP | H10-003308 | 1/1998 |
| JP | 2006-012074 | 1/2006 |
| JP | 2006-018575 | 1/2006 |
| JP | 4103057 | 6/2008 |
| JP | 2015-024477 | 2/2015 |
| JP | 2015-168038 | 9/2015 |
| JP | 2016-071444 | 5/2016 |
| JP | 2016-168661 | 9/2016 |
| JP | 2018-51686 | * 9/2016 |
| JP | 2018-013919 | 1/2018 |
| JP | 2018-051686 | 4/2018 |
| JP | 2018-069366 | 5/2018 |
| JP | 2018-167361 | 11/2018 |
| WO | 2010/092981 | 8/2010 |
| WO | 2017/127202 | 7/2017 |

OTHER PUBLICATIONS

Office Action issued in Indian Patent Application No. 202117057481 dated May 11, 2022.
International Search Report dated Jul. 23, 2019 for PCT/JP2019/019788.
Office Action issued in Japanese Patent Application No. P2019-545836, dated Oct. 15, 2019 (with English partial translation).
International Preliminary Report on Patentability with Written Opinion dated Dec. 2, 2021 for PCT/JP2019/019788.
Office Action issued in Japanese Patent Application No. P2020-019142, dated Mar. 28, 2023 (with English partial translation).
Extended Search Report in corresponding European Application No. 19929443.0 dated Mar. 16, 2023.
Office Action issued in Chinese Patent Application No. 201980096428.1, dated Jan. 29, 2024 (with English partial translation).
Office Action issued in Indian Patent Application No. 202117057481 dated Apr. 6, 2024.

* cited by examiner

SUSPENDED ROBOT RECOVERY

CROSS-REFERENCE TO RELATED APPLICATIONS

This application is a continuation application of PCT Application No. PCT/JP2019/019788, the entire contents of which are incorporated herein by reference.

BACKGROUND

Field

Japanese Unexamined Patent Publication No. 2016-168661 discloses a processing machine system that includes a processing machine and a robot and causes the robot to replace a workpiece with respect to the processing machine.

SUMMARY

Disclosed herein is an example robot system. The robot system may include: a robot; a peripheral device disposed around the robot; and circuitry configured to: control the robot, based on an operation program, to execute a plurality of sequential operations in conjunction with a process performed by the peripheral device; cause the robot to suspend the plurality of sequential operations in response to determining that an irregular state has occurred in the peripheral device; generate a recovery program based, at least in part, on robot state information identifying a state of the robot suspending the plurality of sequential operations; and cause the robot to operate with respect to the peripheral device based on the recovery program so that the plurality of suspended sequential operations become resumable.

DETAILED DESCRIPTION

In the following description, with reference to the drawings, the same reference numbers are assigned to the same components or to similar components having the same function, and overlapping description is omitted.

Robot System

An example robot system disclosed herein executes a predetermined operation (for example, machining, assembly, or the like) on a workpiece by a robot and at least one peripheral device disposed around the robot. Examples of a cooperative form of the robot and the peripheral device include a form in which a predetermined operation is performed by the peripheral device on a workpiece handled by the robot, and a form in which a predetermined operation is performed by the robot on a workpiece which is held and whose position and posture are adjusted by the peripheral device.

Figure 1:
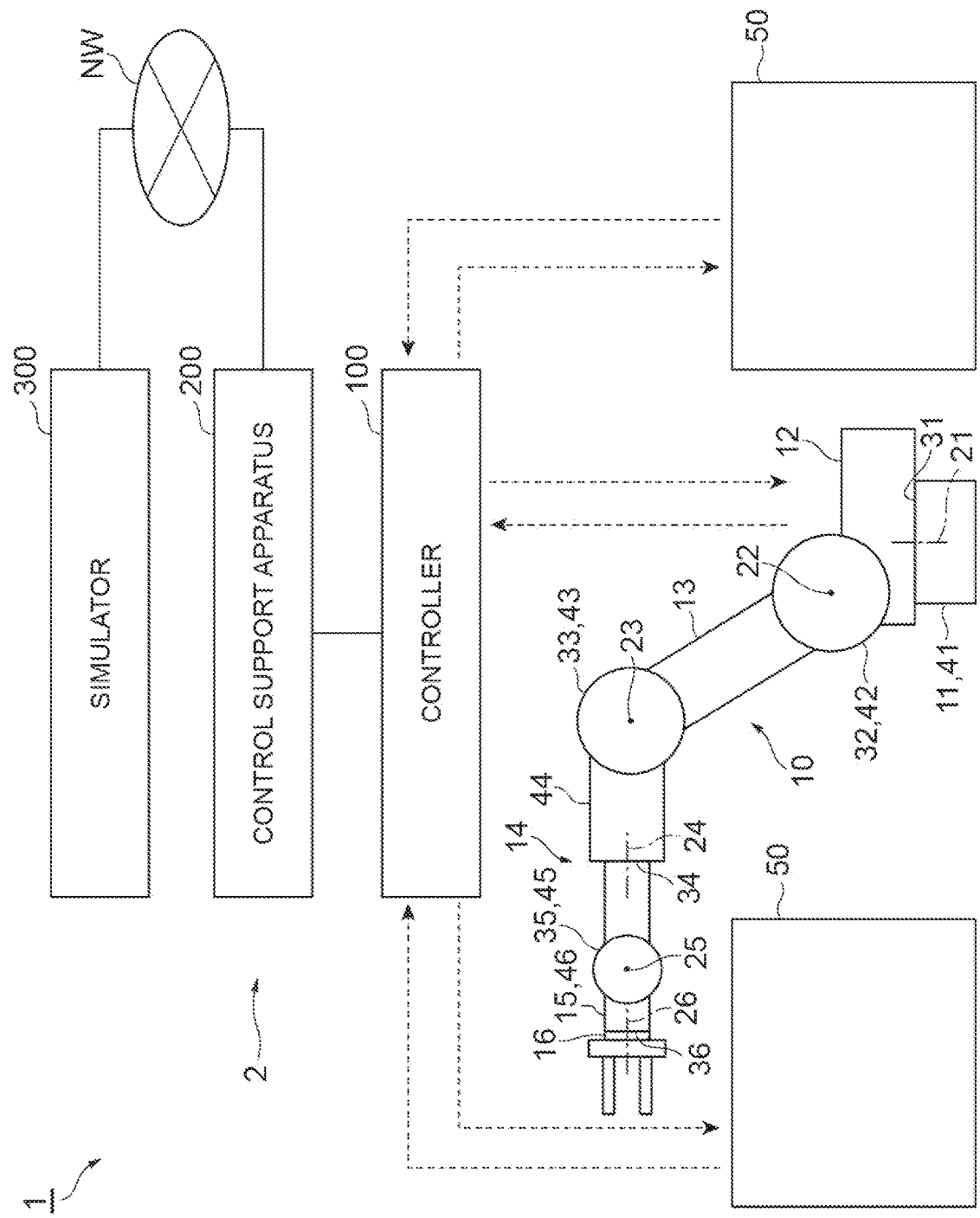
FIG. 1 is a schematic diagram illustrating an example configuration of a robot system.

As shown in FIG. 1, a robot system 1 includes at least one robot 10, at least one peripheral device 50, and a control system 2. The robot 10 is, for example, a six-axis vertical articulated robot, and includes a base 11, a turning portion 12, a first arm 13, a second arm 14, a wrist 15, a tip portion 16, and actuators 41, 42, 43, 44, 45, 46.

The base 11 is fixed to a floor surface, a wheeled platform, or the like. The turning portion 12 is provided on the base 11 and is rotatable around a vertical axis 21. That is, the robot 10 has a joint 31 which allows the turning portion 12 to rotate around the axis 21.

The first arm 13 extends from the turning portion 12 and is a swingable around an axis 22 that intersects (e.g., orthogonally intersects) the axis 21. That is, the robot 10 has a joint 32 which allows the first arm 13 to swing around the axis 22. Here, the intersection includes an intersection in a state of skew relation with each other such as a so-called three-dimensional intersection. The same applies to the following description.

The second arm 14 extends from the tip portion of the first arm 13 and is a swingable around an axis 23 that intersects (e.g., orthogonally intersects) the axis 21. That is, the robot 10 has a joint 33 which allows the second arm 14 to swing around the axis 23. The axis 23 may be parallel to the axis 22.

The tip portion of the second arm 14 is rotatable about an axis 24 that intersects (e.g., orthogonally intersects) the axis 23 along the extend direction of the second arm 14. That is, the robot 10 has a joint 34 which allows the tip portion of the second arm 14 to rotate around the axis 24.

The wrist 15 extends from the tip portion of the second arm 14 and is a swingable around an axis 25 that intersects (e.g., orthogonally intersects) the axis 24. That is, the robot 10 has a joint 35 which allows the wrist 15 to swing around the axis 25.

The tip portion 16 is provided at the tip portion of the wrist 15 and is rotatable about an axis 26 that intersects (e.g., orthogonally intersects) the axis 25 along the extend direction of the wrist 15. That is, the robot 10 has a joint 36 which allows the tip portion 16 to rotate around the axis 26. The tip portion 16 is provided with various tools for work. Examples of the tool include a hand for holding a workpiece, a coating gun for discharging a coating material, and a welding torch.

The actuators 41, 42, 43, 44, 45, 46 drive the joints 31, 32, 33, 34, 35, 36, respectively. For example, the actuator 41 rotates the turning portion 12 around the axis 21, the actuator 42 rotates the first arm 13 around the axis 22, the actuator 43 rotates the second arm 14 around the axis 23, the actuator 44 rotates the tip portion of the second arm 14 around the axis 24, the actuator 45 rotates the wrist 15 around the axis 25, and the actuator 46 rotates the tip portion 16 around the axis 26.

The robot 10 can be configured in any manner as long as the position and posture of the tip portion 16 can be changed within a desired range. For example, the robot 10 may be a seven-axis vertical articulated robot in which redundant axis is added to the six-axis vertical articulated robot described above. The robot 10 may be a so-called scalar robot or a parallel link robot.

Examples of the peripheral device 50 include numerical control (NC) machine tools (for example, a machining center, an NC lathe, an NC milling machine, and the like), a workpiece posture adjustment device that holds a workpiece and adjusts a posture, and the like. The peripheral device 50 may be a robot configured similarly to the robot 10. Although one robot 10 and two peripheral devices 50 are shown in FIG. 1, the number of the robot 10 and the peripheral device 50 is not particularly limited.

The control system 2 is configured to execute: operating at least the robot based on a program; suspending a plurality of sequential operations performed by the robot 10 in conjunction with the peripheral device 50 based on an operation program if an irregular state occurs in the peripheral device; generating a recovery program based at least on a robot state information of the robot 10 at the time of suspending the operation due to an occurrence of the irregular state; and causing the robot 10 to operate with respect to the peripheral device 50 based on the recovery program so that an operation by the suspended operation program becomes resumable.

For example, the control system 2 includes a controller 100, a control support apparatus 200, and a simulator 300. Hereinafter, examples of these configurations will be individually described. Based on the positions of the robot 10 and the peripheral device 50, the controller 100 is arranged on a so-called edge side. On the other hand, the simulator 300 is arranged on a so-called cloud side. For example, the simulator 300 communicates with the controller 100 via the communication network NW. The communication network NW may be the Internet or a private network.

The control support apparatus 200 is interposed between the simulator 300 and the controller 100. The control support apparatus 200 may be interposed between the simulator 300 and a plurality of controllers 100. The control support apparatus 200 may be provided on the edge side or may be provided on the cloud side. For example, the control support apparatus 200 is provided on the edge side and connected to the controller 100. Here, connection means communicable wirelessly or by wire.

The simulator 300 communicates with at least one control support apparatus 200 via the communication network NW and with the controller 100 via the communication network NW and the control support apparatus 200. The simulator 300 may communicate with the plurality of control support apparatus 200. Hereinafter, functions and configurations of the controller 100, the control support apparatus 200, and the simulator 300 will be individually described.

Controller

The controller 100 executes: at least controlling the robot 10 based on the program; suspending the plurality of sequential operations when an irregular state occurs in the peripheral device 50; acquiring a recovery program based on robot state information of the robot 10 at a time point when the operation is suspended due to the occurrence of the irregular state; and operating the robot 10 with respect to the peripheral device 50 based on the recovery program so that the operation by the suspended operation program becomes resumable.

For example, the controller 100 is a cell controller that controls at least one robot 10 and at least one peripheral device 50 that are grouped into one cell. The controller 100 is configured to output a drive power to the actuators 41, 42, 43, 44, 45, 46 of the robot 10 and to output a control command to the peripheral device 50. The controller 100 may be configured to output drive power instead of the control command to at least one peripheral device 50.

The controller 100 may not have to be grouped into a single housing, and may be divided into a plurality of housings. For example, the controller 100 may be divided into a robot controller that outputs drive power to the actuators 41, 42, 43, 44, 45, 46 of the robot 10 in response to a control command, and a programmable logic controller that outputs a control command to the robot controller and the peripheral device 50.

In a case where the peripheral device 50 which receives the drive power (hereinafter referred to as "first type peripheral device 50") and the peripheral device 50 which receives the control command (hereinafter referred to as "first type peripheral device 50") exist, the controller 100 may be divided into the robot controller, a servo driver that outputs the drive power to the first type peripheral device 50 in response to the control command, and a programmable logic controller that outputs the control command to the robot controller, the servo driver, and the second type peripheral device 50.

Figure 2:
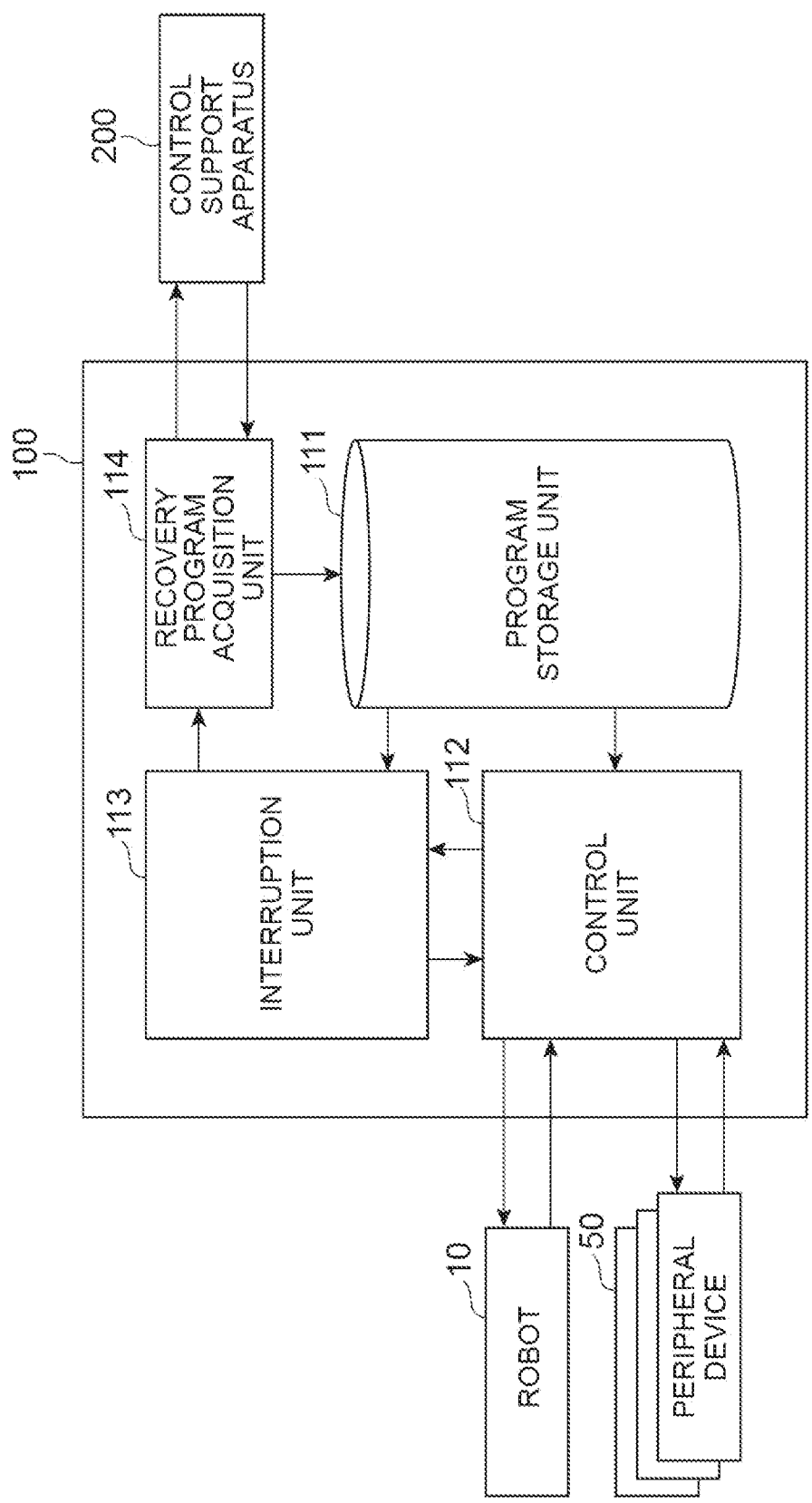
FIG. 2 is a block diagram illustrating a functional configuration of an example controller.

As shown in FIG. 2, the controller 100 (control apparatus) includes a program storage unit 111, a control unit 112, a suspension unit 113, and a recovery program acquisition unit 114 as a functional configuration (hereinafter referred to as "functional block").

The program storage unit 111 stores an operation program for operating the robot 10 and the peripheral device 50. The operation program includes a robot operation program for operating the robot 10, and a peripheral process program for causing the peripheral device 50 to execute processing in conjunction with the robot 10.

The robot operation program includes a plurality of unit jobs arranged in time series. Each unit job is a program for causing the robot 10 to execute a series of unit operations. Examples of the unit operation include gripping a workpiece, conveying a gripped workpiece, attaching a workpiece to the peripheral device 50, detaching a workpiece from the peripheral device 50, attaching a tool to the peripheral device 50, detaching a tool from the peripheral device 50, gripping a tool, conveying a gripped tool, and processing a workpiece with a tool.

For example, the unit job includes a plurality of operation commands arranged in time series. Each operation command includes a target position and a target posture of the tip portion 16, a move speed to the target position and the target posture, and an interpolation method from the present position and the present posture to the target position and the target posture. Examples of the interpolation method include linear interpolation and S-shaped interpolation.

The robot operation program may have a suspendable point between one or more of the plurality of unit operations of the robot 10. The information indicating the suspendable point may be stored in association with the unit job. For example, each unit job may include a stoppable flag indicating whether the operation of the robot 10 can be interrupted after completion of the job. For example, when the stoppable flag of the unit job is "OK", the suspendable point is between the unit job and the next unit job.

The peripheral process program includes at least one process commands for causing the peripheral device 50 to execute processing in conjunction with the robot 10. The process command is an instruction code representing the contents of a series of unit processes in a format recognizable by the peripheral device 50.

The control unit 112 is configured to operate at least the robot 10 based on the program. For example, the control unit 112 operates the robot 10 based on the robot operation program and operates the peripheral device 50 based on the peripheral device operation program.

For example, the control unit 112 repeats control of the robot 10 and the peripheral device 50 in a predetermined control cycle. In each control cycle, the control unit 112 calculates a control command for the robot 10 based on the states of the robot 10 and the peripheral device 50 and the robot operation program, and outputs drive power corresponding to the calculated control command to the actuators 41, 42, 43, 44, 45, 46.

For example, the control unit 112 calculates the target position and the target posture of the tip portion 16 for each control cycle based on the states of the robot 10 and the peripheral device 50 and the robot operation program, and calculates the target angle of the actuators 41, 42, 43, 44, 45, 46 as the control command by inverse kinematics calculation based on the target position and the target posture. In each control cycle, the control unit 112 calculates and outputs a control command for the peripheral device 50 based on the states of the robot 10 and the peripheral device 50 and the peripheral device operation program.

The suspension unit 113 is configured to suspend operations by the robot 10 based on the robot operation program (a series of plurality of unit operations performed in conjunction with the peripheral device 50) if an irregular state occurs in the peripheral device 50. The suspension unit 113 may suspend an operation by the peripheral device 50 based on the peripheral device operation program (operation performed in conjunction with the robot 10).

Examples of the irregular state include an installation failure of a workpiece, an installation failure of a tool, an absence of a workpiece, an absence of a tool, a quality failure of a workpiece, an over-load abnormality of an actuator, abnormal heat generation, and an opening/closing failure of a door of the peripheral device 50. The irregular state generated in the peripheral device 50 includes an irregular state generated due to an operation failure of the robot 10 such as a gripping failure of a workpiece or a gripping failure of a tool.

The suspension unit 113 may suspend the plurality of unit operations by the robot 10 at the suspendable point after the irregular state occurs in the peripheral device 50. For example, the suspension unit 113 may suspend a plurality of unit operations by the robot 10 at the suspendable point that comes next when an irregular state occurs in the peripheral device 50.

The recovery program acquisition unit 114 is configured to acquire at least the recovery program based on the state information of the robot 10 at the time when the operation is suspended due to the occurrence of the irregular state. For example, the recovery program acquisition unit 114 transmits the state information of the robot system 1 at the time when the robot 10 suspends the operation due to the occurrence of the irregular state to the control support apparatus 200, and acquires the recovery program generated based on the state information of the robot system 1 from the control support apparatus 200.

The state information of the robot system 1 includes the state information of the robot 10 (hereinafter referred to as "robot state information"). and the state information of the peripheral device 50 (hereinafter referred to as "peripheral device state information").

The robot state information includes at least information indicating the position and posture of the tip portion 16. The information indicating the position and posture of the tip portion 16 may be angular information of the joints 31, 32, 33, 34, 35, 36. The robot state information may further include a captured image of the robot 10 and the like.

The peripheral device state information includes irregular state information indicating an irregular state in the peripheral device 50. Examples of the irregular state information include level information indicating a load level, a heat generation level, and the like, and various kinds of alarm information for notifying the occurrence of various irregular states described above. The peripheral device state information may further include a captured image or the like of the peripheral device 50.

The recovery program may include a recovery program for a robot (hereinafter referred to as "robot recovery program") and a recovery program for the peripheral device 50 (hereinafter referred to as "peripheral recovery program")

The robot return program is a program for causing the robot 10 to execute an operation (hereinafter referred to as "recovery operation") for making the operation according to the suspended operation program resumable. Examples of the recovery operation include workpiece replacement, tool replacement, workpiece reinstallation, tool reinstallation, and the like. In addition, if the peripheral device 50 is a robot having the same configuration that of the robot 10 (hereinafter referred to as "another robot"), the recovery operation may include replacing work that was scheduled to be executed by another robot.

Making an operation by a suspended operation program resumable includes making the operation resumable from a time point before the suspended time point, in addition to making the operation resumable from the suspended time point. The time point before the interruption time point may be a start time point of the operation program. The term "resumable" means a state in which the irregular state is released and the operation by the operation program can be resumed.

Like the robot operation program, the robot recovery program includes a plurality of unit jobs arranged in time series. The robot recovery program may include one unit job. The peripheral recovery program is a program for causing the peripheral device 50 to execute a process for making the operation by the suspended operation program resumable (hereinafter, referred to as "recovery process"). Examples of the recovery process include recovery to the origin. The peripheral recovery program includes at least one process command for causing the peripheral device 50 to execute a recovery process in conjunction with the robot 10.

When the recovery program acquisition unit 114 acquires the recovery program, the control unit 112 causes the peripheral device 50 to operate the robot 10 based on the recovery program so that the operation by the suspended operation program becomes resumable. Thereafter, the control unit 112 causes the robot 10 to resume the operation according to the suspended operation program.

When the recovery program includes the robot recovery program and the peripheral recovery program, the control unit 112 operates the robot 10 with respect to the peripheral device 50 based on the robot recovery program so that the operation by the suspended operation program is resumable, and performs the recovery process in conjunction with the robot 10 and the peripheral device 50 based on the peripheral recovery program.

The controller 100 may be configured to periodically transmit the state information of the robot system 1 to the control support apparatus 200 even when the irregular state does not occur.

Control Support Apparatus

The control support apparatus 200 is configured to execute: at least obtaining the robot state information and the irregular state information; specifying a type of the irregular state based on at least the irregular state information; and outputting a recovery program of the robot 10 for making an operation by the suspended operation program resumable based on at least the type of the irregular state and the robot state information.

Figure 3:
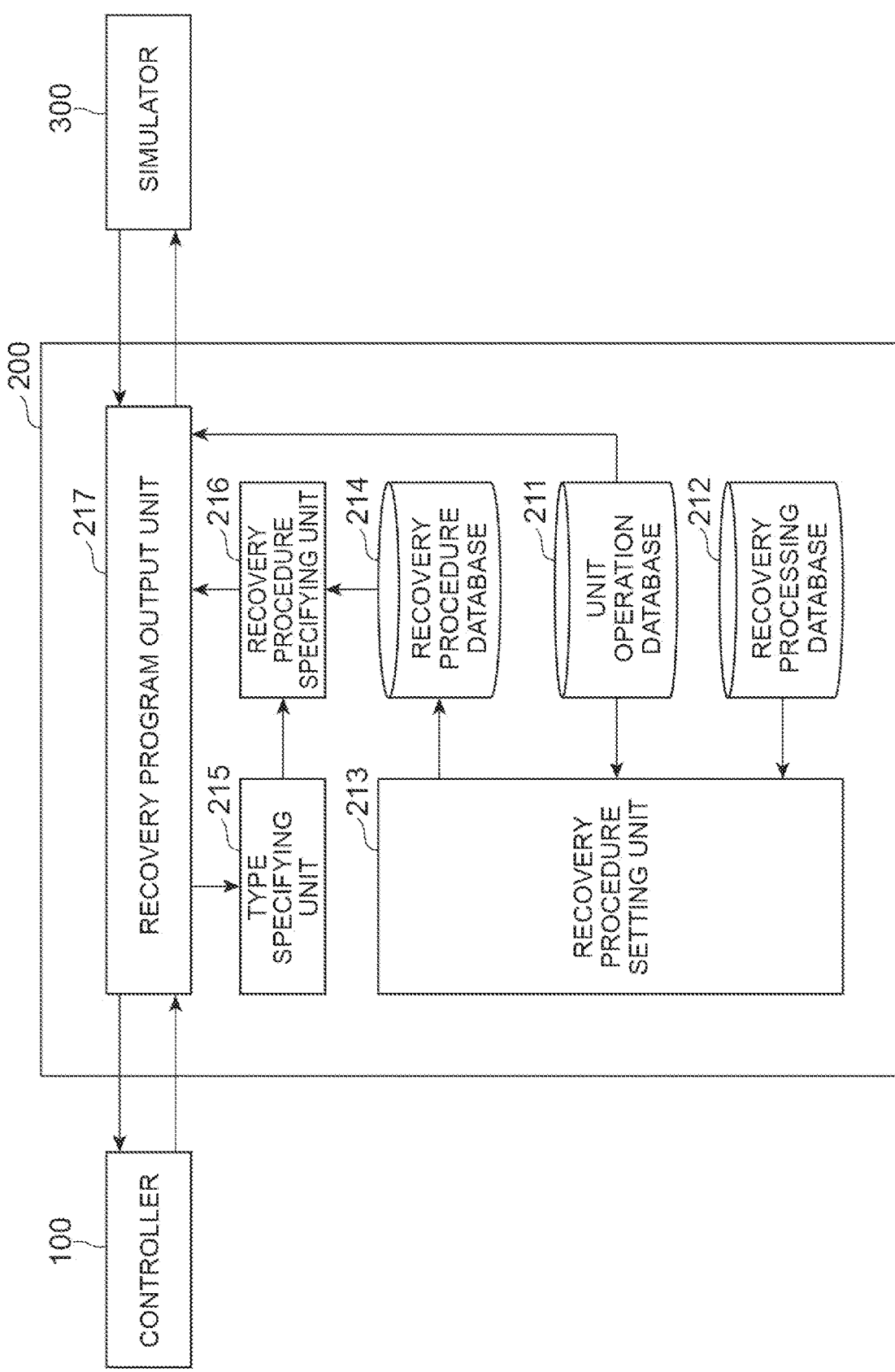
FIG. 3 is a block diagram illustrating a functional configuration of an example control support apparatus.

The control support apparatus 200 is a computer that communicates with at least one controller 100 and supports control by the controller 100 based on information collected from the controller 100. The control support apparatus 200 may be configured to communicate with the plurality of controllers 100 and support control by each controller 100 based on information collected from the plurality of controllers 100. As shown in FIG. 3, the control support apparatus 200 includes, as functional blocks, a unit operation database 211, a recovery process database 212, a recovery procedure setting unit 213, a recovery procedure database 214, a type specifying unit 215, a recovery procedure specifying unit 216, and a recovery program output unit 217.

The unit operation database 211 stores a plurality of unit operations available to configure the robot recovery operation. The unit operation database 211 may store a plurality of unit operations as conceptual information representing an operation purpose, such as gripping of a workpiece, conveyance of a gripped workpiece, attachment of a workpiece to the peripheral device 50, detachment of a workpiece from the peripheral device 50, attachment of a tool to the peripheral device 50, detachment of a tool from the peripheral device 50, gripping of a tool, conveyance of a gripped tool, or the like. The unit operation database 211 may store a plurality of unit jobs in association with a plurality of unit operations. The plurality of unit jobs stored in the unit operation database 211 may include a unit job common to the unit job included in the robot operation program of the program storage unit 111.

The recovery process database 212 stores a plurality of unit processes available to configure the recovery process. For example, the recovery process database 212 may store a plurality of unit processes as conceptual information indicating a processing purpose such as initialization or origin return, or may store a plurality of process commands in association with a plurality of unit processes. The plurality of process commands stored in the recovery process database 212 may include a process command common to the process commands included in the peripheral process program of the program storage unit 111.

The recovery procedure setting unit 213 is configured to set a recovery procedure based on a user input (for example, an input to the input device 226) for each type of irregular state that may occur in the peripheral device 50. The recovery procedure includes a recovery procedure to be executed by the robot 10 in order to make the operation by the operation program suspended by the occurrence of the irregular state resumable (hereinafter referred to as "robot recovery procedure") and a recovery procedure to be executed by the peripheral device 50 (hereinafter referred to as "peripheral recovery procedure"). The robot recovery procedure includes at least one unit operation and an execution procedure thereof. The peripheral recovery procedure includes at least one unit process and their execution order.

The recovery procedure database 214 stores the recovery procedure set by the recovery procedure setting unit 213 for each type of irregular state. The type specifying unit 215 specifies the type of irregular state based on at least irregular state information. Here, "type" is information indicating a factor of an irregular state at a level at which a recovery procedure can be derived. For example, the type specifying unit 215 specifies to which type of the recovery procedure database 214 the irregular state corresponds based on the irregular state information.

The recovery procedure specifying unit 216 (unit operation specifying unit) is configured to specify one or more unit operations representing the operation of the predetermined the robot 10 based on the type of irregular state specified by the type specifying unit 215. For example, the recovery procedure specifying unit 216 specifies the recovery procedure based on the type of irregular state specified by the type specifying unit 215 and the recovery procedure database 214. More particularly, the recovery procedure specifying unit 216 specifies a recovery procedure associated with the type of irregular state in the recovery procedure database 214. Accordingly, at least one unit operation included in the robot recovery procedure is specified, and at least one unit process included in the peripheral recovery procedure is specified as the recovery process.

Thus, since the unit operation and the recovery process corresponding to the type of the irregular state are specified, specifying the type of the irregular state by the type specifying unit 215 corresponds to specifying the unit operation and the recovery process. That is, the type specifying unit 215 specifies one or more unit operations by the robot 10 and specifies a recovery process in the peripheral device 50 in addition to the type of the irregular state based on the irregular state information.

The recovery program output unit 217 is configured to output the recovery program of the robot 10 for making the operation by the suspended operation program resumable to the controller 100 based on at least the type of irregular state and robot state information. For example, the recovery program output unit 217 transmits the recovery procedure specified by the recovery procedure specifying unit 216 and the state information of the robot system 1 acquired from the controller 100 to the simulator 300, acquires the recovery program generated based on the recovery procedure and the state information of the robot system 1 from the simulator 300, and outputs the acquired recovery program to the controller 100.

Simulator

The simulator 300 (recovery program generation unit) is configured to execute, when an irregular state occurs in the peripheral device 50, at least acquiring robot state information of the robot 10 that suspends a plurality of sequential operations performed in conjunction with the peripheral device 50 based on the operation program, and generating a recovery program of the robot 10 for causing an operation by the suspended operation program to be resumable based on at least the robot state information.

The simulator 300 may generate the recovery program using a simulation of the robot 10 and the peripheral device 50 based on at least the robot state information. The simulator 300 may generate the recovery program by replicating the states of the robot 10 and the peripheral device 50 on the simulation based on at least the irregular state information and the robot state information. The simulator 300 may generate a recovery program using simulation based on at least the type of irregular state and robot state information.

The simulator 300 is a cell simulator that simulates control by the controller 100 based on the simulation model of the robot 10 and the peripheral device 50. The simulator 300 communicates with the at least 1 the control support apparatus 200 and performs simulation of control by the at least 1 the controller 100 based on information collected by the control support apparatus 200. The simulator 300 may be in communication with the plurality of control support apparatus 200 and configured to simulate control by the plurality of controllers 100 based on information collected by each the control support apparatus 200.

Figure 4:
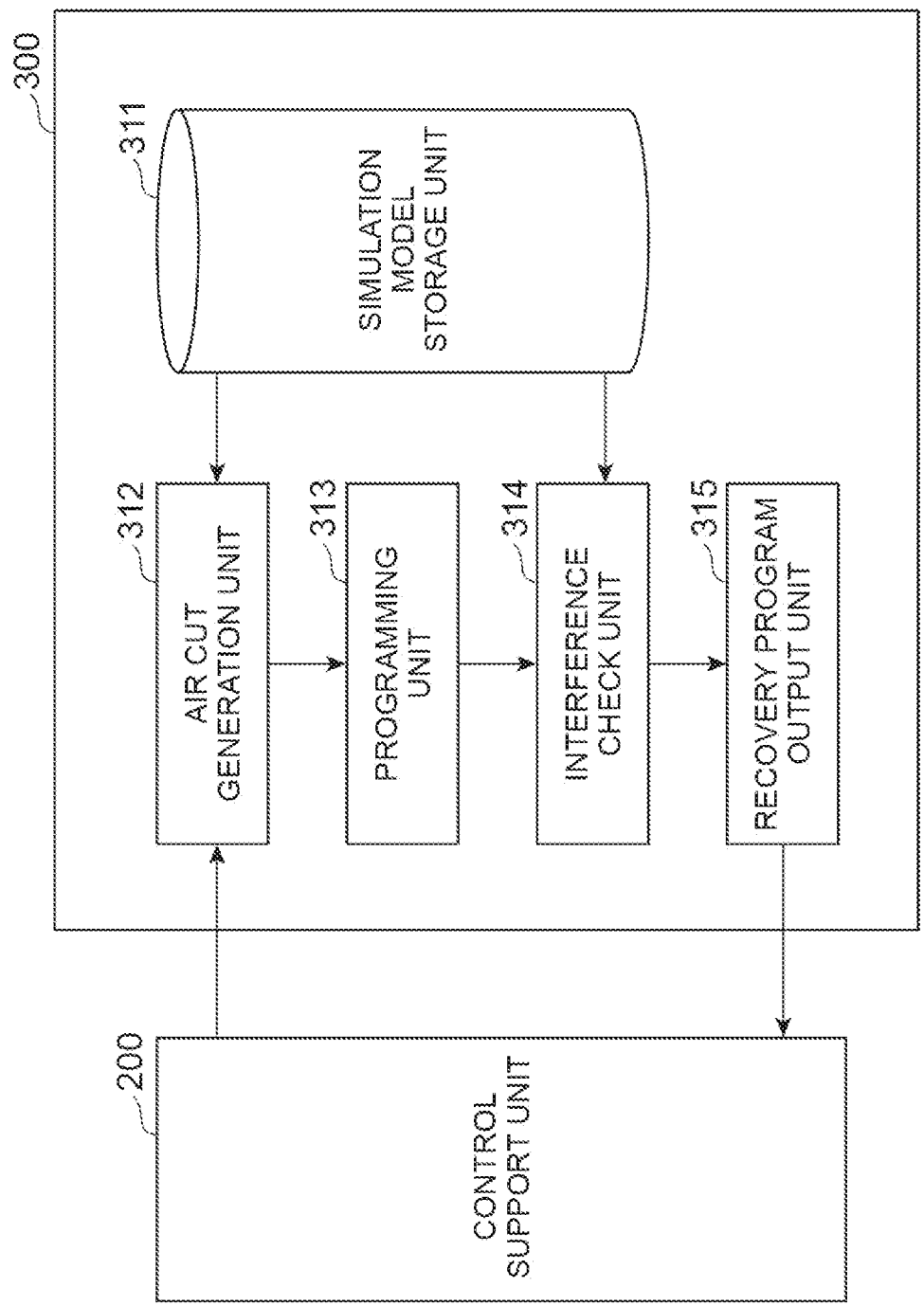
FIG. 4 is a block diagram illustrating a functional configuration of an example simulator.

As shown in FIG. 4, the simulator 300 includes, as functional blocks, a simulation model storage unit 311, an air cut generation unit 312, a programming unit 313, an interference check unit 314, and a recovery program output unit 315.

The simulation model storage unit 311 stores model information of the robot 10, model information of the peripheral device 50, and model information of the workpiece and the tool. The model information of the robot 10 includes the arrangement, structure, and dimensions of the robot 10. The model information of the peripheral device 50 includes the arrangement, structure, and dimensions of the peripheral device 50. The model information of the workpiece, the tool, and the like includes a structure and dimensions of each portion.

The air cut generation unit 312 is configured to generate an air cut operation to be operated by the robot 10 at least one of before and after the unit operation using simulation based on at least one unit operation included in the recovery procedure acquired from the control support apparatus 200 and the robot state information. An example of the air cut operation is a transitional operation for starting the unit operation. The air cut generation unit 312 may generate one or more air cut operations for starting one or more unit operations.

The air cut generation unit 312 may generate the air cut operation using simulation so that the robot 10 does not collide with other objects including the peripheral device 50. For example, the air cut generation unit 312 replicates the models of the states of the robot 10 and the peripheral device 50 in a virtual space based on the state information of the robot system 1 and the model information stored in the simulation model storage unit 311, and generates the air cut operation from the present position and posture of the tip portion 16 to the start point of the first unit operation (the target position and target posture of the first operation command) based on the models.

The air cut generation unit 312 is configured to generate the air cut operation between unit operations when the recovery procedure includes a plurality of unit operations. For example, the air cut generation unit 312 generates an air cut operation from the end point of the preceding unit operation (a target position and a target posture of the last operation command) to the start point of the following unit operation (a target position and a target posture of the first operation command). As an example of the air cut operation, the air cut generation unit 312 generates an air cut job including a plurality of operation commands arranged in time series. Each operation command includes a target position and a target posture of the tip portion 16, a move speed to the target position and the target posture, and an interpolation method from the present position and the present posture to the target position and the target posture.

As an example, the air cut generation unit 312 repeats generating, in a section of the air cut operation, a via-point capable of avoiding a collision with the other objects and modifying the air cut job so as to pass through the via-point until the collision can be avoided over the entire air cut job. A method of generating the air cut job is also disclosed in detail in, for example, Japanese Patent No. 4,103,057.

The programming unit 313 is configured to generate a robot recovery program based on at least one unit operation included in the recovery procedure and the air cut operation generated by the air cut generation unit 312. For example, the programming unit 313 generates a robot recovery program by connecting at least one unit job corresponding to at least one unit operation included in the recovery procedure and the air cut job generated by the air cut generation unit 312. The programming unit 313 generates the peripheral recovery program based on the recovery process included in the recovery procedure.

The interference check unit 314 is configured to check on the simulation whether the robot 10 will collide with another object based on the robot recovery program generated by the programming unit 313. For example, the interference check unit 314 calculates the transition of the posture of the robot 10 based on the robot recovery program by the inverse kinematics calculation and the forward kinematics calculation based on the model stored in the simulation model storage unit 311, and checks the presence or absence of collision in each posture.

The recovery program output unit 315 is configured to output a recovery program, which is a combination of the robot recovery program generated by the programming unit 313 and determined not to interfere by the interference check unit 314, and the peripheral recovery program generated by the programming unit 313, to the control support apparatus 200. The recovery program output unit 315 may output the recovery program to the control support apparatus 200, or may output, to the control support apparatus 200, a program in which an operation program to be resumed after the recovery program is connected to the recovery program.

The control support apparatus 200 outputs the recovery program acquired from the recovery program output unit 315 to the controller 100. In response, the control unit 112 of the controller 100 operates the robot 10 to the peripheral device 50 based on the robot recovery program, and causes the peripheral device 50 to execute the recovery process in conjunction with the robot 10 based on the peripheral recovery program. Thereafter, the controller 100 resumes the operation of the robot 10 and the peripheral device 50 based on the operation program.

Figure 5:
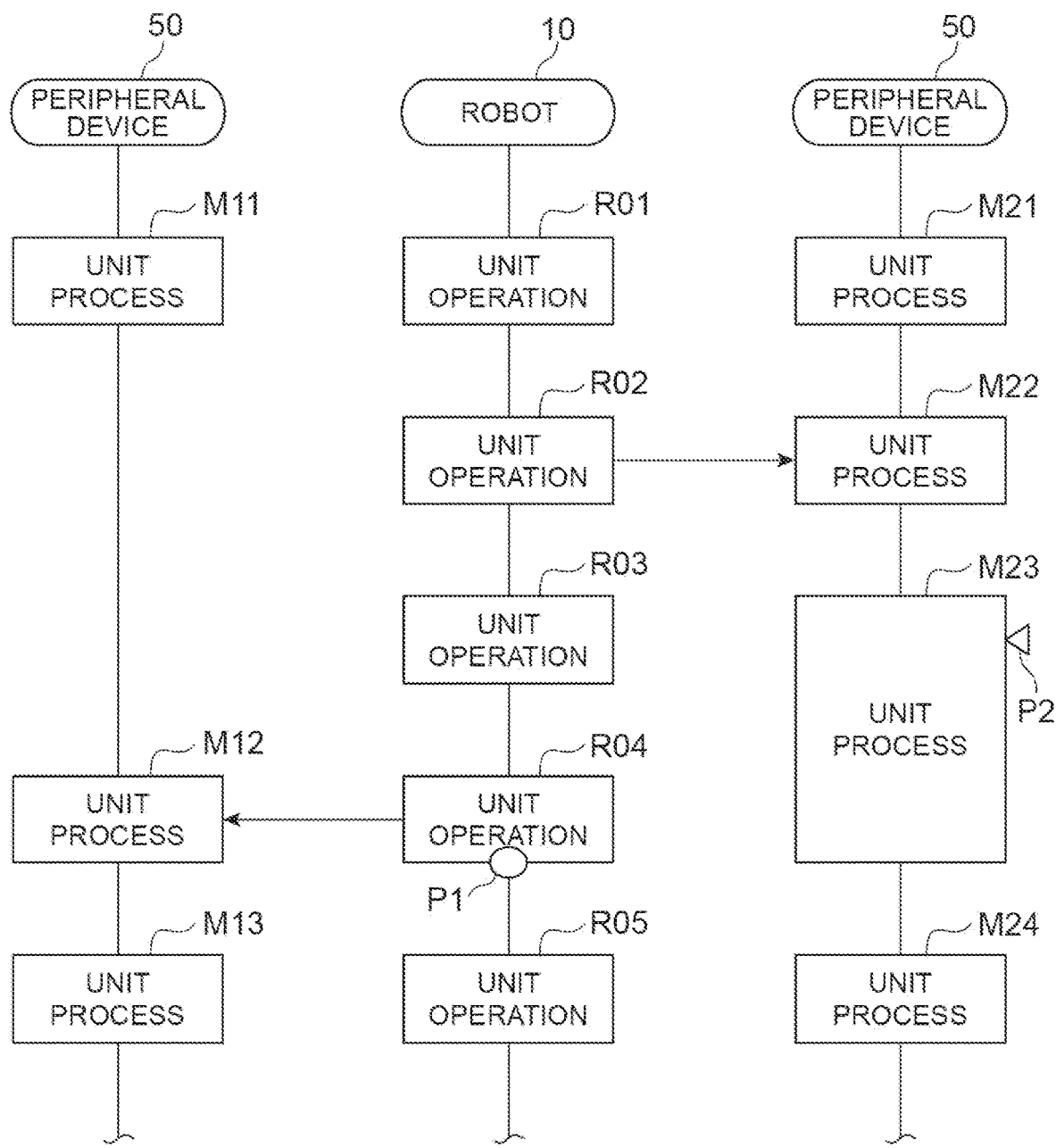
FIG. 5 is a sequence diagram illustrating an example operation program.

FIG. 5 is a sequence diagram illustrating the operation of the robot 10 and the processing of the peripheral device 50 based on the operation program. The operation of the robot 10 includes the unit operations R01, R02, R03, R04, R05. The processing of the peripheral device 50 on the left includes the unit processes M11, M12, M13, and the unit process M12 is executed in conjunction with the unit operation R04. The processing of the peripheral device 50 on the right includes the unit processes M21, M22, M23, M24, and the unit process M22 is executed in conjunction with the unit operation R02. The point P1 immediately after the unit operation R04 represents the suspendable point.

Example action of the control system 2 when an irregular state occurs in the middle of the unit process M23 of FIG. 5 (see the point P2) will be described. When an irregular state occurs at the point P2, the controller 100 continues the operation of the robot 10 until the point P1, which is a suspendable point after the point P2, and suspends the operation of the robot 10.

Figure 6:
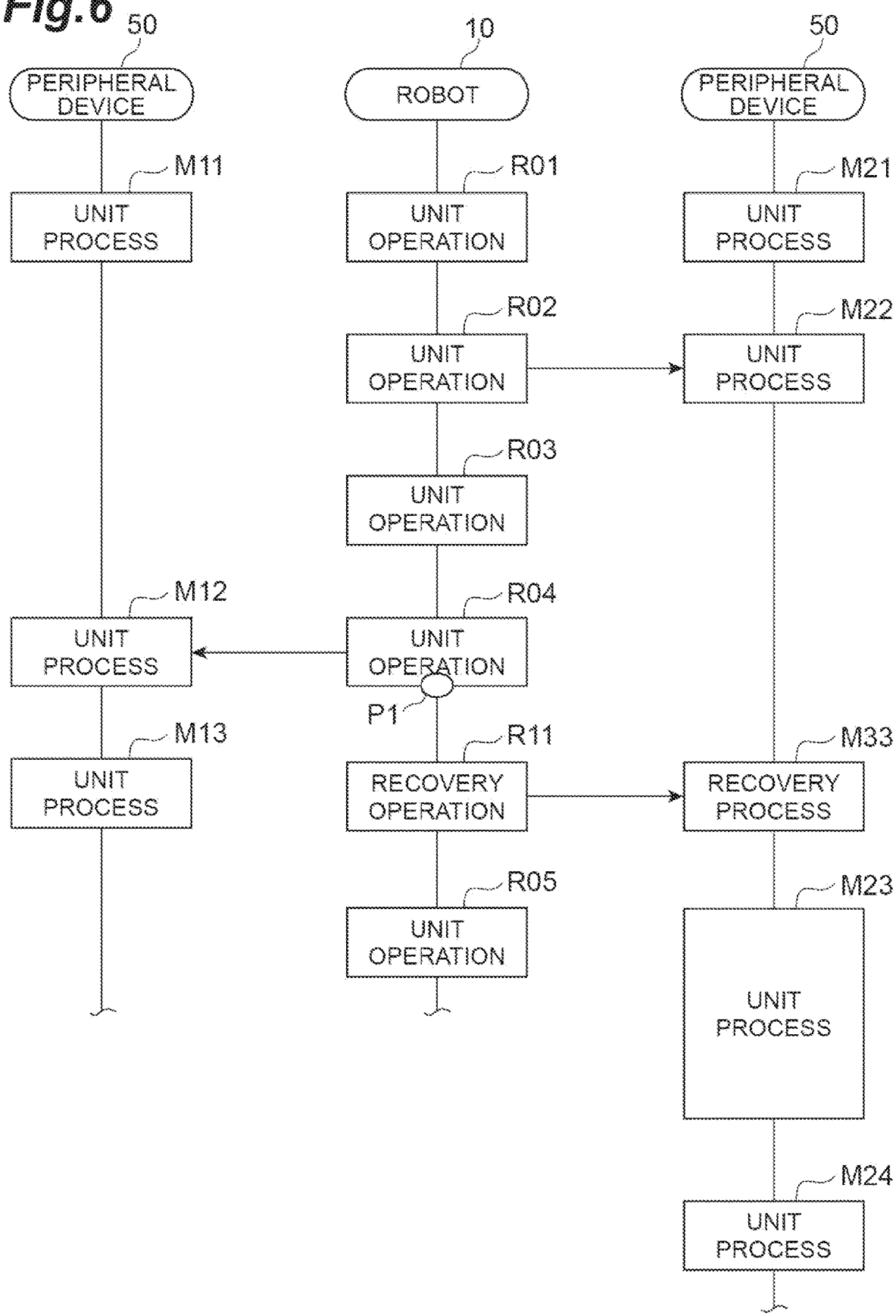
FIG. 6 is a sequence diagram illustrating an operation program in which a recovery program is inserted.

Thereafter, a recovery program is generated by the control support apparatus 200 and the simulator 300 and output to the controller 100. In response, as shown in FIG. 6, the controller 100 causes the robot to execute the recovery operation R11 based on the robot recovery program. In conjunction with this, the controller 100 causes the peripheral device 50 to execute the recovery process M33 based on the peripheral recovery program.

Thereafter, the controller 100 resumes the operation of the robot 10 from the unit operation R05, resumes the processing of the peripheral device 50 on the left side from the unit process M13, and resumes the processing of the peripheral device 50 on the right side from the unit process M23 in which the irregular state has occurred.

When the unit operation included in the recovery procedure is the concept information, the simulator 300 may be configured to execute generation of the unit job corresponding to the unit operation. The simulator 300 may be configured to store the generated recovery program in association with the recovery procedure and the state information of the robot system 1. In this case, when the recovery procedure matches the state information of the robot system 1, the past recovery program can be reused.

Hardware Configuration of Control System

Figure 7:
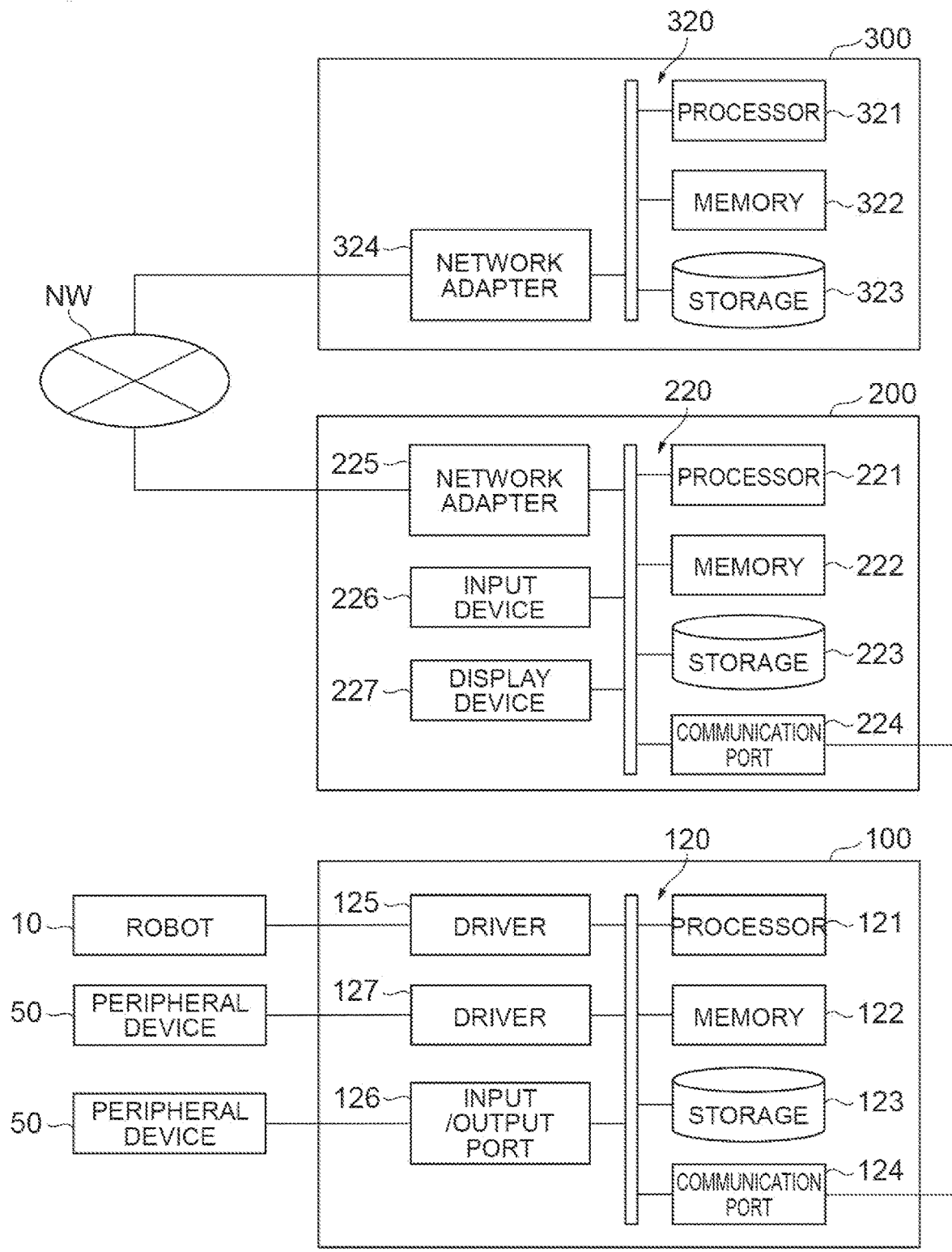
FIG. 7 is a block diagram illustrating a hardware configuration of an example control system.

FIG. 7 is a block diagram illustrating a hardware configuration of the control system. As shown in FIG. 7, the controller 100 includes circuitry 120. The circuitry 120 includes at least one processor 121, a memory 122, storage 123, a communication port 124, a driver 125, an input/output port 126, and a driver 127. The storage 123 is a non-volatile computer-readable storage medium (for example, a flash memory). The storage 123 stores a program for causing the controller 100 to control at least the robot 10 based on the program, suspend the plurality of sequential operations if an irregular state occurs in the peripheral device 50, acquire a recovery program based at least on robot state information of the robot 10 at the time of suspending the operation due to the occurrence of the irregular state, and cause the robot 10 to operate with respect to the peripheral device 50 based on the recovery program so that the operation by the suspended operation program becomes resumable. For example, the storage 123 stores a program for configuring each functional block described above in cooperation with hardware of the controller 100.

The memory 122 temporarily stores the program loaded from the storage 123, the operation result by the processor 121, and the like. The processor 121 constitutes each functional block of the controller 100 by executing the program in cooperation with the memory 122. The communication port 124 performs network communication with the control support apparatus 200 in response to a command from the processor 121. For example, the communication port 124 is used to acquire the recovery program by the recovery program acquisition unit 114. The driver 125 drives the actuators 41, 42, 43, 44, 45, 46 of the robot 10 in accordance with a command from the processor 121. The input/output port 126 inputs and outputs electrical signals to and from the peripheral device 50 in response to commands from the processor 121. The driver 127 drives the actuator of the peripheral device 50 in accordance with a command from the processor 121.

The control support apparatus 200 includes circuitry 220. The circuitry 220 includes at least one processor 221, a memory 222, storage 223, a communication port 224, a network adapter 225, an input device 226, and a display device 227. The storage 223 is a non-volatile computer-readable storage medium (for example, a flash memory). The storage 223 stores a program for causing the control support apparatus 200 to execute: acquiring at least the robot state information and the irregular state information; specifying a type of the irregular state based on at least the irregular state information; and outputting a recovery program for the robot 10 to make an operation according to the suspended operation program resumable based on at least the type of the irregular state and the robot state information. For example, the storage 223 stores a program for configuring each functional block described above in cooperation with hardware of the control support apparatus 200.

The memory 222 temporarily stores the program loaded from the storage 223, the operation result by the processor 221, and the like. The processor 221 constitutes each functional block of the control support apparatus 200 by executing the program in cooperation with the memory 222. The communication port 224 performs network communication with the controller 100 in response to a command from the processor 221. For example, the communication port 224 is used to output a recovery program by the recovery program output unit 217. The network adapter 225 communicates with the simulator 300 via the communication network NW in response to a command from the processor 221. The input device 226 is, for example, a keyboard. The display device 227 is, for example, a liquid crystal monitor. The input device 226 and the display device 227 may be integrated as a so-called touch panel. The input device 226 and the display device 227 are used for setting a recovery procedure by the recovery procedure setting unit 213, for example.

The simulator 300 includes circuitry 320. The circuitry 320 includes at least one processor 321, a memory 322, storage 323, and a network adapter 324. The storage 323 is a non-volatile computer-readable storage medium (for example, a hard disk drive or a flash memory). The storage 323 stores a program for causing the simulator 300 to execute: acquiring, when an irregular state occurs in the peripheral device 50, at least robot state information of the robot 10 that suspends a plurality of sequential operations in conjunction with the peripheral device 50 based on the operation program; and generating a recovery program for the robot 10 to make the operation by the suspended operation program resumable based on at least the robot state information. For example, the storage 323 stores a program for configuring each functional block described above in cooperation with hardware of the simulator 300.

The memory 322 temporarily stores the program loaded from the storage 323, the operation result by the processor 321, and the like. The processor 321 constitutes each functional block of the simulator 300 by executing the program in cooperation with the memory 322. The network adapter 324 communicates with the control support apparatus 200 via the communication network NW in response to a command from the processor 321.

The above-described hardware configuration is merely an example, and can be changed. For example, the simulator 300 may not be disposed on the cloud side, and may be disposed on the edge side together with the controller 100 and the control support apparatus 200. The control support apparatus 200 may be incorporated into the controller 100, or the control support apparatus 200 and the simulator 300 may be incorporated into the controller 100. In addition, the controller 100, the control support apparatus 200, and the simulator 300 may not be limited to those which configure each function by a program. For example, at least a part of the functions of the controller 100, the control support apparatus 200, and the simulator 300 may be configured by dedicated logic circuitry or an application specific integrated circuit (ASIC) in which the dedicated logic circuitry is integrated.

Control Method

Next, a control procedure of the robot system 1 will be described as an example of control methods. This control procedure includes a control procedure of the robot 10 and the peripheral device 50 by the controller 100, a generation support procedure of the recovery program by the control support apparatus 200, a generation procedure of the recovery program by the simulator 300, and a setting procedure of the recovery procedure by the control support apparatus 200. Hereinafter, example of each procedure will be described in detail.

Control Procedure

The control procedure of the robot 10 and the peripheral device 50 by the controller 100 includes controlling at least the robot 10 based on the program, suspending the plurality of sequential operations when an irregular state occurs in the peripheral device 50, acquiring a recovery program based on at least the robot state information of the robot 10 at the time of suspending the operation by the occurrence of the irregular state, and causing the robot 10 to operate with respect to the peripheral device 50 based on the recovery program so that the operation by the suspended operation program becomes resumable.

Figure 8:
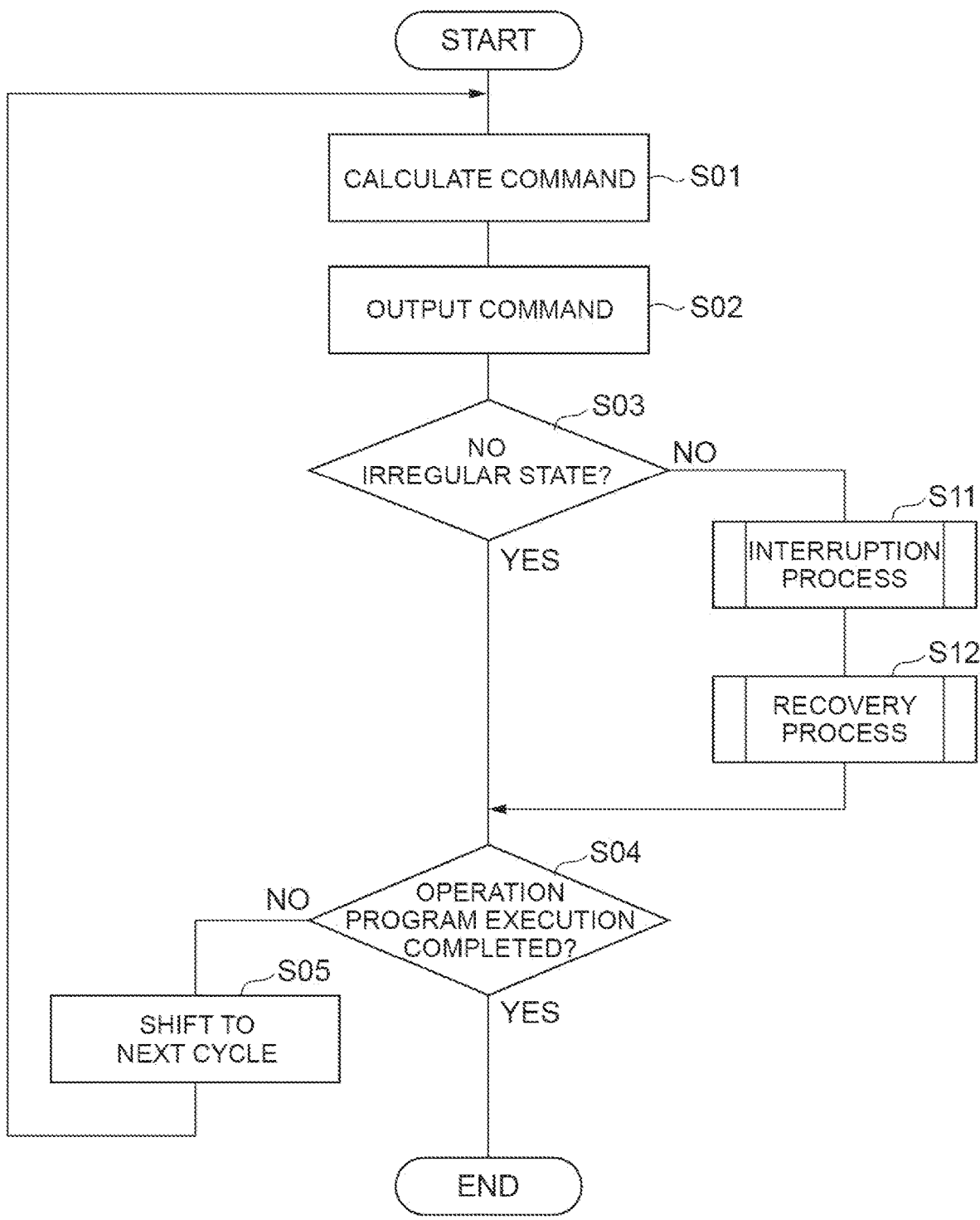
FIG. 8 is a flowchart illustrating an example control procedure.

As shown in FIG. 8, the controller 100 first executes operations S01, S02, and S03. In the operation S01, the control unit 112 calculates the target position and the target posture of the tip portion 16 based on the states of the robot 10 and the peripheral device 50 and the robot operation program, and calculates the target angle of the actuators 41, 42, 43, 44, 45, 46 as the control command by inverse kinematics calculation based on the target position and the target posture. The control unit 112 calculates a control command for the peripheral device 50 based on the states of the robot 10 and the peripheral device 50 and the peripheral device operation program.

In the operation S02, the control unit 112 outputs the drive power corresponding to the control command calculated in the operation S01 to the actuators 41, 42, 43, 44, 45, 46, and outputs the control command calculated in the operation S01 to the peripheral device 50. In the operation S03, the suspension unit 113 checks whether an irregular state occurs. For example, the suspension unit 113 checks whether an irregular state occurs based on the state information acquired from the peripheral device 50.

If it is determined that no irregular state occurs in the operation S03, the controller 100 executes a operation S04. In the operation S04, the control unit 112 checks whether the execution of the operation program is completed.

If it is determined that the execution of the operation program is not completed in the operation S04, the controller 100 executes a operation S05. In the operation S05, the control unit 112 shifts the processing to the control of the next cycle after the elapse of the control cycle. The controller 100 then returns the process to the operation S01. Thereafter, until the execution of the operation program is completed, the control of the robot 10 and the peripheral device 50 is continued while confirming the occurrence of the irregular state.

If it is determined that an irregular state has occurred in the operation S03, the controller 100 executes interruption processing in a operation S11. Thereafter, the controller 100 executes the recovery process in a operation S12 and then causes the operation S04 to resume. Contents of the interruption process and the recovery process will be described later.

If it is determined that the execution of the operation program is completed in the operation S04, the controller 100 completes the control of the robot 10 and the peripheral device 50.

Figure 9:
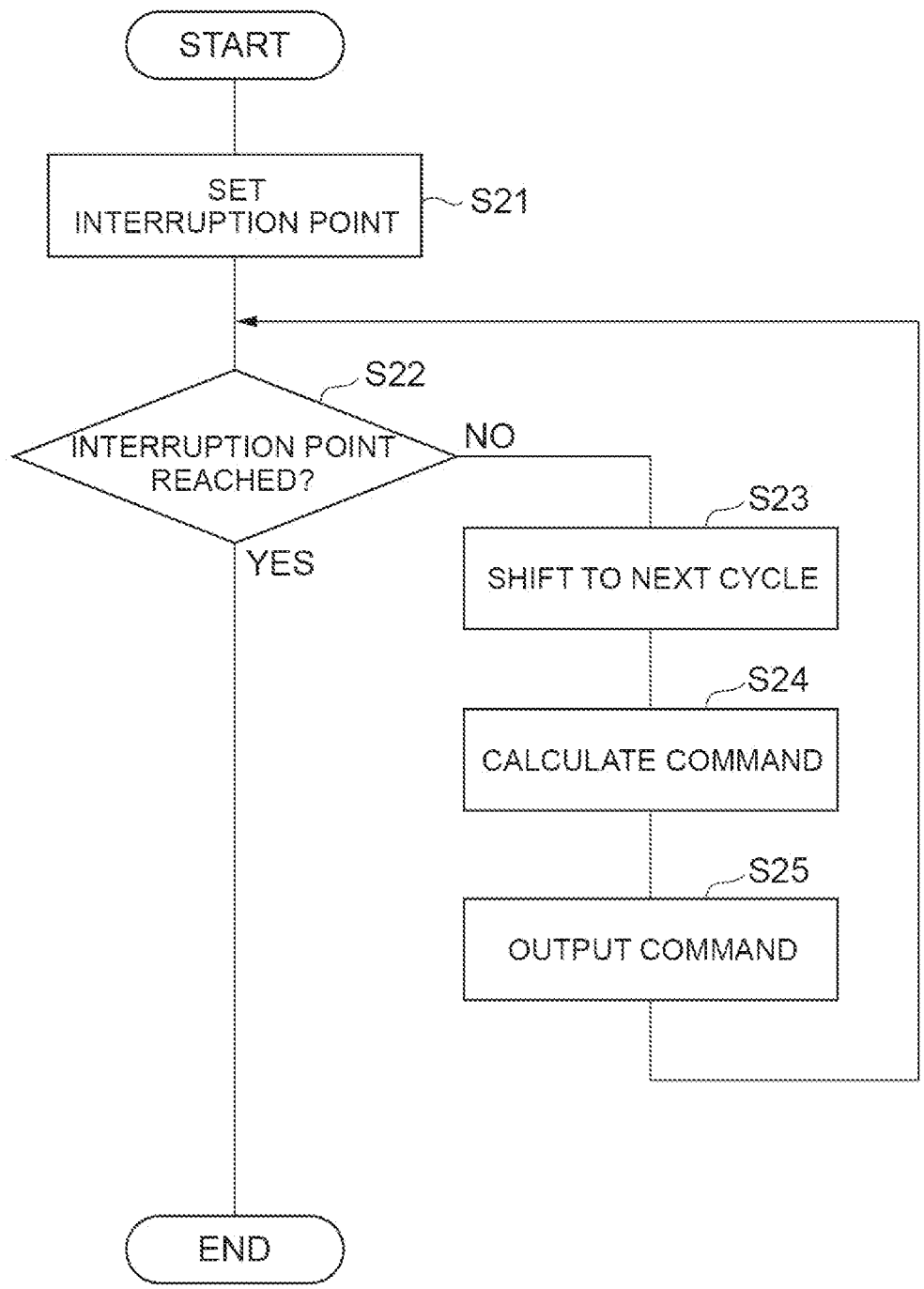
FIG. 9 is a flowchart illustrating an example interruption processing procedure.

FIG. 9 is a flowchart illustrating a procedure of interruption processing in the operation S11. As shown in FIG. 9, the controller 100 first executes operations S21 and S22. In the operation S21, the suspension unit 113 sets the suspendable point that comes next when an irregular state occurs in the peripheral device 50 as the interruption point of the operation by the robot 10. In the operation S22, the suspension unit 113 checks whether the operation by the robot 10 has reached the interruption point.

If it is determined in the operation S22 that the operation by the robot 10 has not reached the interruption point, the controller 100 executes operations S23, S24, and S25. In the operation S23, the control unit 112 shifts the processing to the control of the next cycle after the elapse of the control cycle. In the operation S24, like the operation S01, the control unit 112 calculates control commands for the robot 10 and the peripheral device 50. In the operation S25, similarly to the operation S02, the control unit 112 outputs the drive power corresponding to the control command calculated in the operation S24 to the actuators 41, 42, 43, 44, 45, 46, and outputs the control command calculated in the operation S24 to the peripheral device 50. The controller 100 then returns the process to the operation S22.

When the operation S22 determines that the operation by the robot 10 has reached the suspend point, the suspension unit 113 suspends the control of the robot 10 and the peripheral device 50 by the control unit 112. Thus, the interruption process is completed.

Figure 10:
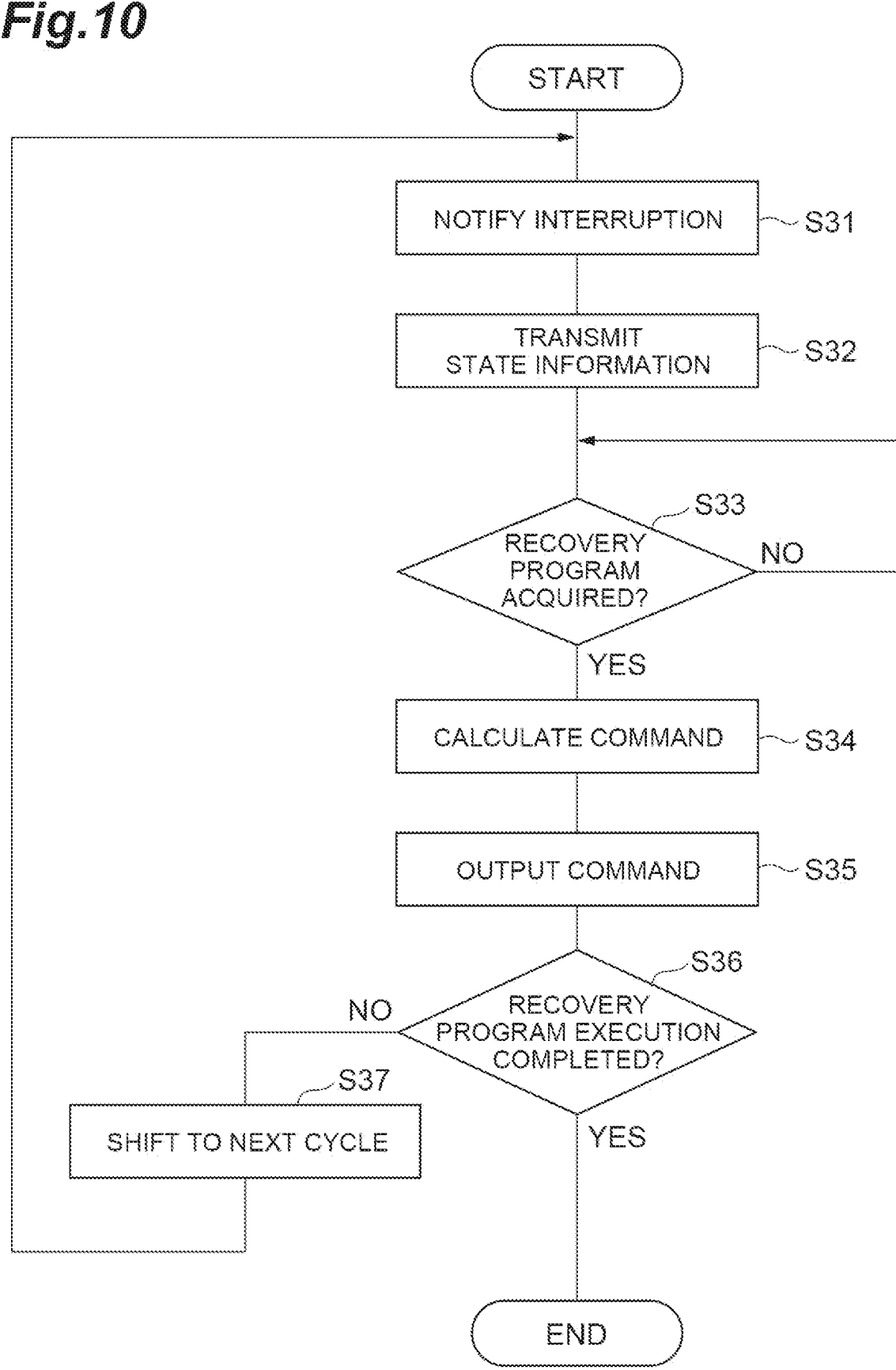
FIG. 10 is a flowchart illustrating an example recovery process procedure.

FIG. 10 is a flowchart illustrating a procedure of a recovery process in the operation S12. As shown in FIG. 10, the controller 100 first executes operations S31, S32, S33, S34, S35, and S36. In the operation S31, the recovery program acquisition unit 114 notifies the control support apparatus 200 of the interruption of the operation of the robot 10 and the peripheral device 50 due to the occurrence of the irregular state. In the operation S32, the recovery program acquisition unit 114 transmits the state information of the robot system 1 at the time when the robot 10 suspends the operation due to the occurrence of the irregular state to the control support apparatus 200. In the operation S33, the recovery program acquisition unit 114 waits for acquiring the recovery program generated based on the state information of the robot system 1 from the control support apparatus 200.

In the operation S34, the control unit 112 calculates the target position and the target posture of the tip portion 16 based on the states of the robot 10 and the peripheral device 50 and the robot recovery program, and calculates the target angle of the actuators 41, 42, 43, 44, 45, 46 as the control command by inverse kinematics calculation based on the target position and the target posture. The control unit 112 further calculates a control command for the peripheral device 50 based on the states of the robot 10 and the peripheral device 50 and the peripheral device operation program. In the operation S35, the control unit 112 outputs the drive power corresponding to the control command calculated in the operation S34 to the actuators 41, 42, 43, 44, 45, 46, and outputs the control command calculated in the operation S34 to the peripheral device 50. In the operation S36, the control unit 112 checks whether the execution of the recovery program is completed.

If it is determined that the execution of the recovery program is not completed in the operation S36, the controller 100 executes the operation S37. In the operation S37, the control unit 112 waits for the passage of the control cycle and shifts to the control of the next cycle. The controller 100 then returns the process to the operation S31. Thereafter, the control of the robot 10 and the peripheral device 50 based on the recovery program is continued until the execution of the recovery program is completed.

If it is determined that the execution of the recovery program is completed in the operation S36, the controller 100 completes the control of the robot 10 and the peripheral device 50 based on the recovery program. This completes the recovery process.

Generation Support Procedure of Recovery Program

The generation support procedure of the recovery program by the control support apparatus 200 includes acquiring at least the robot state information and the irregular state information, specifying the type of the irregular state based on at least the irregular state information, and outputting the recovery program of the robot 10 for making the operation by the suspended operation program resumable based on at least the type of the irregular state and the robot state information.

Figure 11:
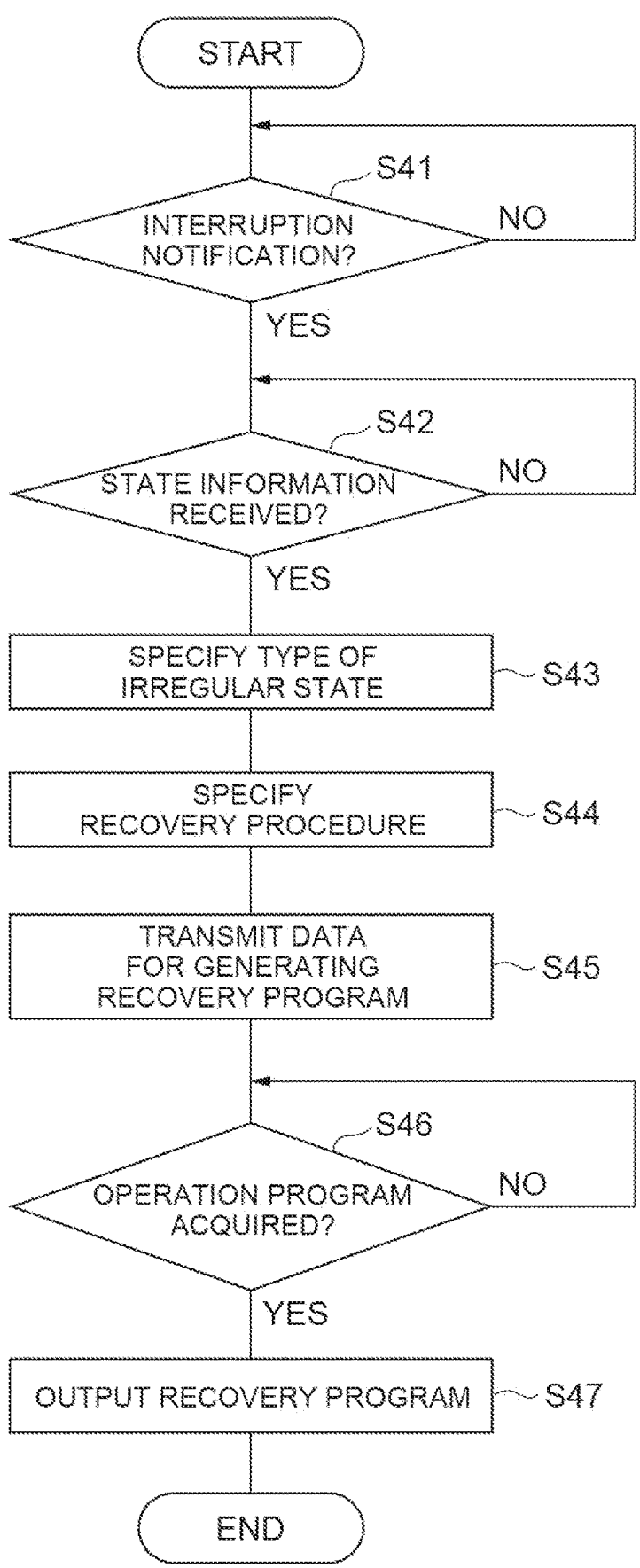
FIG. 11 is a flowchart illustrating an example recovery program generation support procedure.

As shown in FIG. 11, the control support apparatus 200 executes operations S41, S42, S43, S44, S45, S46, and S47. In the operation S41, the recovery program output unit 217 waits for notification of interruption of operation of the robot 10 and the peripheral device 50. In the operation S42, the recovery program output unit 217 waits for the reception of the state information of the robot system 1 at the time when the robot 10 suspends the operation due to the occurrence of the irregular state.

In the operation S43, the type specifying unit 215 specifies the type of irregular state based on at least irregular state information. In the operation S44, the recovery procedure specifying unit 216 specifies a recovery procedure based on the type of irregular state specified by the type specifying unit 215 and the recovery procedure database 214.

In the operation S45, the recovery program output unit 217 transmits the recovery procedure specified by the recovery procedure specifying unit 216 and the state information of the robot system 1 acquired from the controller 100 to the simulator 300. In the operation S46, the recovery program output unit 217 waits for acquiring the recovery program generated based on the recovery procedure and the state information of the robot system 1 from the simulator 300. In the operation S47, the recovery program output unit 217 outputs the recovery program acquired from the simulator 300 to the controller 100. This completes the recovery program generation support procedure.

Generation Procedure of Recovery Program

The generation procedure of the recovery program by the simulator 300 includes, when an irregular state occurs in the peripheral device 50, acquiring at least robot state information of the robot 10 that suspends a plurality of sequential operations associated with the peripheral device 50 based on the operation program, and generating the recovery program of the robot 10 for making the operation by the suspended operation program resumable based on at least the robot state information.

Figure 12:
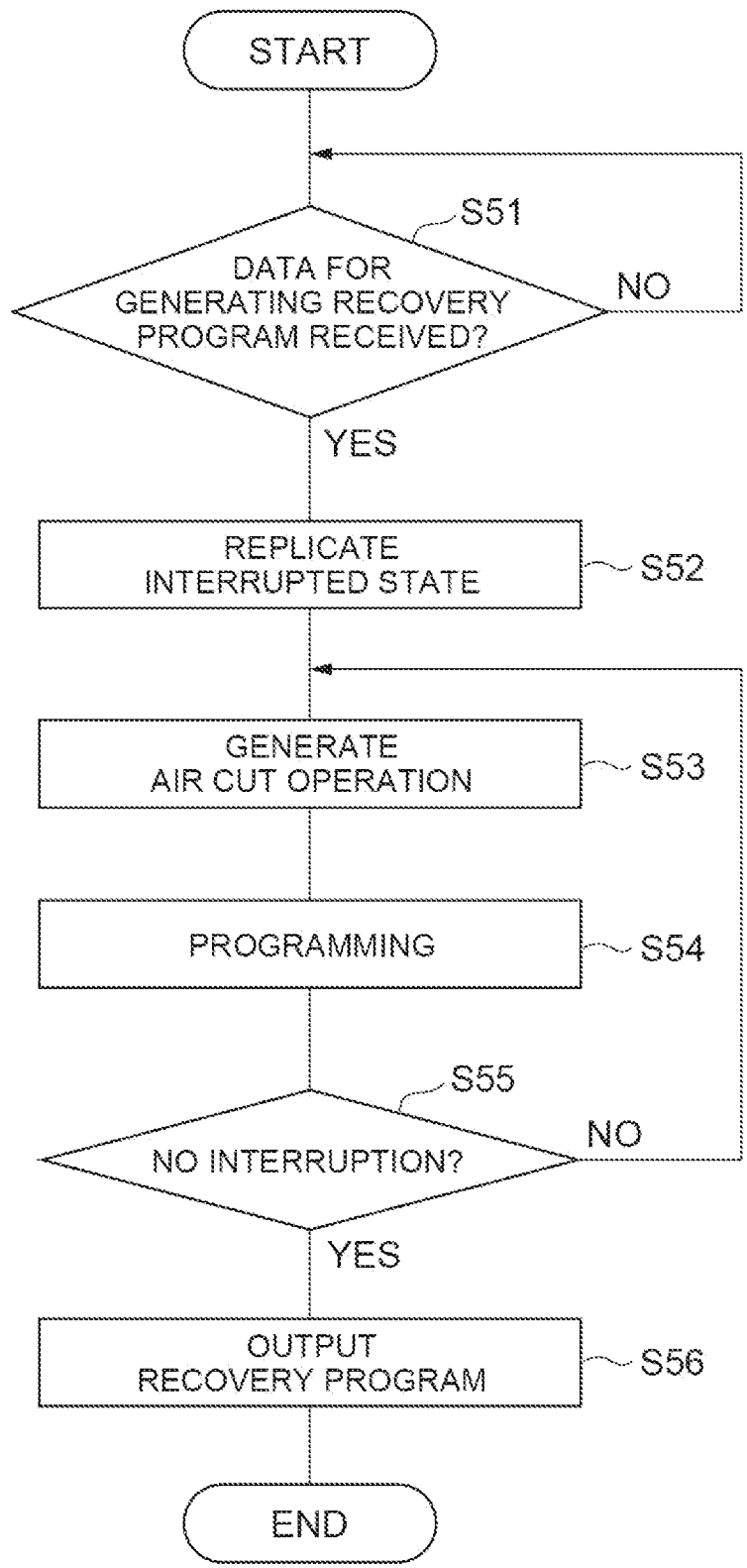
FIG. 12 is a flowchart illustrating a procedure for generating an example recovery program.

As shown in FIG. 12, the simulator 300 first executes operations S51, S52, S53, S54, and S55. In the operation S51, the air cut generation unit 312 waits for the recovery procedure specified by the recovery procedure specifying unit 216 and the state information of the robot system 1 acquired from the controller 100 to be received from the control support apparatus 200. In the operation S52, the air cut generation unit 312 replicates the states of the robot 10 and the peripheral device 50 in a virtual space based on the state information of the robot system 1 and the model information stored in the simulation model storage unit 311. Hereinafter, a state in which the air cut generation unit 312 is replicated in the virtual space is referred to as a "replication model".

In the operation S53, the air cut generation unit 312 generates the air cut operation based on the replication model. In the operation S54, the programming unit 313 generates the robot recovery program based on at least one unit operation included in the recovery procedure and the air cut operation generated by the air cut generation unit 312. The programming unit 313 further generates the peripheral recovery program based on the recovery process included in the recovery procedure. In the operation S55, based on the robot recovery program generated by the programming unit 313, the interference check unit 314 checks on simulation whether the robot 10 will not collide with other objects.

If it is determined in the operation S55 that the robot 10 will collide with the other object, the simulator 300 returns the process to the operation S53 and executes the generation of the air cut operation again. If the operation S55 determines that the robot 10 will not collide with the other object, the simulator 300 executes a operation S56. In the operation S56, the recovery program output unit 315 outputs a recovery program, which is a combination of the robot recovery program generated by the programming unit 313 and confirmed not to interfere by the interference check unit 314, and the peripheral recovery program generated by the programming unit 313, to the control support apparatus 200. Thus, the generation processing of the recovery program is completed.

Setting Procedure of Recovery Procedure

The setting procedure of the recovery procedure by the control support apparatus 200 includes acquiring a selection input of a unit operation of the robot 10 and a selection input of a unit process of the peripheral device 50 for each type of irregular state, and setting the recovery procedure based on the unit operation and the recovery process selected by the selection inputs.

Figure 13:
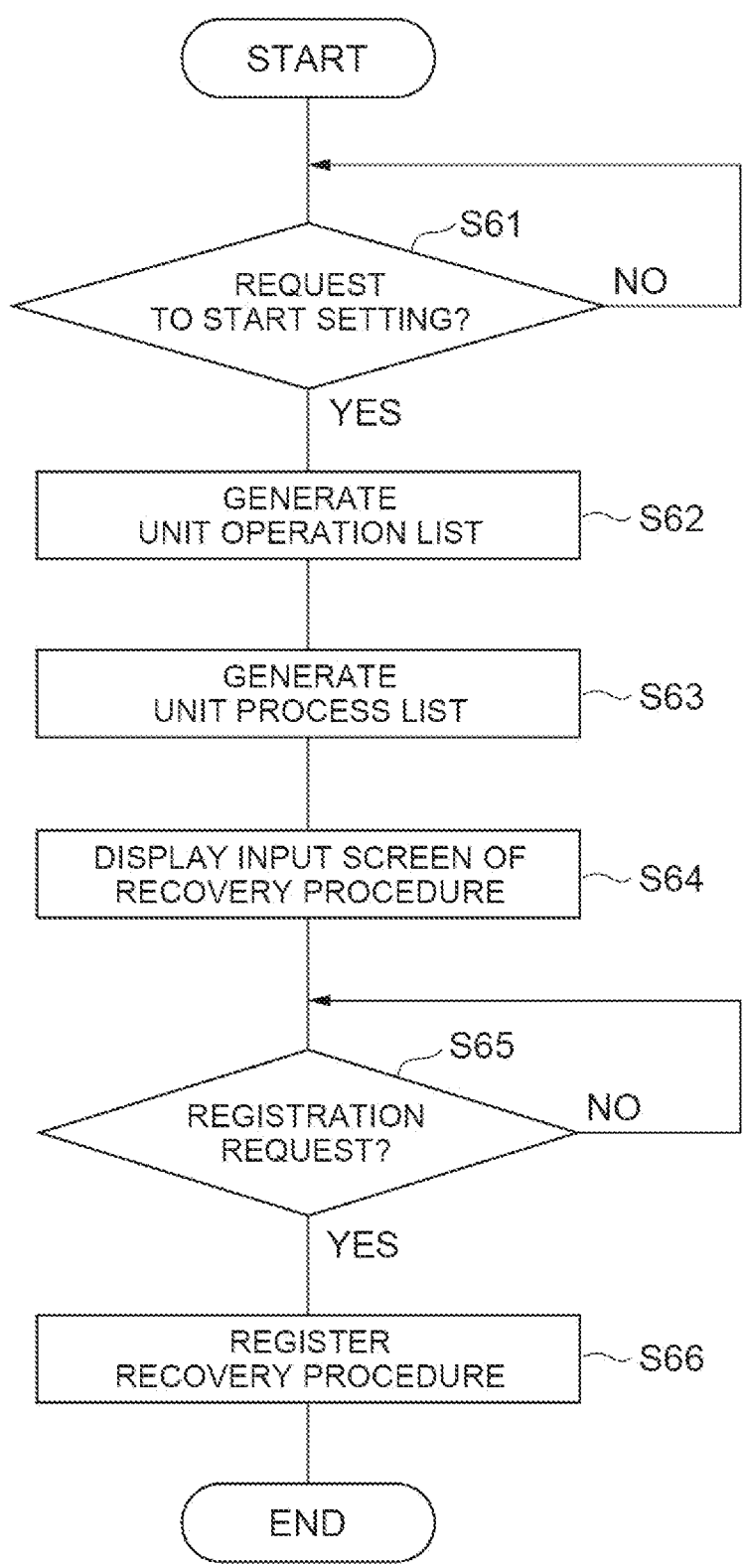
FIG. 13 is a flowchart illustrating an example recovery procedure setting procedure.

As shown in FIG. 13, the control support apparatus 200 executes operations S61, S62, S63, S64, S65, and S66. In the operation S61, the recovery procedure setting unit 213 waits for a request to start setting the recovery procedure to be input (for example, input to the input device 226). In the operation S62, the recovery procedure setting unit 213 generates a list of the plurality of unit operations stored in the unit operation database 211. In the operation S63, the recovery procedure setting unit 213 generates a list of the plurality of unit processes stored in the recovery process database 212.

In the operation S64, the recovery procedure setting unit 213 displays an input screen of the recovery procedure (for example, displayed in the display device 227). The input screen includes a display section for displaying a list generated in the operations S61 and S62, an input section for designating the type of irregular state to be set in the recovery procedure, and an input section for selecting unit operations and unit processes while determining the order of executing them.

In the operation S65, the recovery procedure setting unit 213 waits for a request for registration of input contents to the input screen. In the operation S66, the recovery procedure setting unit 213 sets a recovery procedure based on the input contents to the input screen, and stores the recovery procedure in the recovery procedure database 214 in association with the type in the input screen. This completes the recovery procedure setting procedure.

As described above, the robot system 1 includes the robot 10, the peripheral device 50 disposed around the robot 10, the control unit 112 configured to operate at least the robot 10 based on a program, the suspension unit 113 configured to suspend a plurality of sequential operations performed by the robot 10 in conjunction with the peripheral device 50 based on an operation program if an irregular state occurs in the peripheral device 50, and the simulator 300 configured to generate a recovery program based at least on a robot state information of the robot 10 at the time of suspending the operation due to an occurrence of the irregular state, and the control unit 112 is further configured to cause the robot 10 to operate with respect to the peripheral device 50 based on the recovery program so that an operation by the suspended operation program becomes resumable.

According to the robot system 1, when the operation of the robot 10 is suspended due to the occurrence of the irregular state, the suspended operation can be automatically resumed based on the recovery program. Further, since the recovery program is automatically generated based on the robot state information, various irregular states may be automatically recovered without preparing many recovery programs in advance.

The simulator 300 may be configured to generate the recovery program using a simulation of the robot 10 and the peripheral device 50 based at least on the robot state information. In this case, a flexible and reliable recovery program can be generated by simulation.

The simulator 300 may be configured to generate the recovery program by replicating the states of the robot 10 and the peripheral device 50 on the simulation based at least on irregular state information representing at least the irregular state of the peripheral device 50 and the robot state information. In this case, a more reliable recovery program can be generated.

The robot system 1 may further include the type specifying unit 215 configured to specify the type of the irregular state based at least on the irregular state information, and the simulator 300 may be further configured to generate the recovery program using the simulation based at least on the type of the irregular state and the robot state information. The logic for specifying the type of irregular state can be set without the skill of operation programming of the robot 10. Therefore, by separating the simulator 300 and the type specifying unit 215, the construction of the database and the logic used for the specification by the type specifying unit 215 may be left to the user, thereby facilitating the start-up of the robot system 1.

The type specifying unit 215 may be further configured to specify the recovery process in the peripheral device 50 in addition to the type of irregular state based on the irregular state information, and the peripheral device 50 may execute the recovery process. In this case, the operation of the peripheral device 50 can be automatically resumed.

The robot system 1 may further include the recovery procedure specifying unit 216 configured to specify one or more unit operations representing a predetermined operation of the robot 10 based on the type of irregular state, and the simulator 300 may include the air cut generation unit 312 for generating an air cut operation to be performed by the robot 10 before, after or before and after the one or more unit operations using simulation based at least on the unit operation and robot state information, and the programming unit 313 configured to generate the recovery program based on the one or more unit operations and the air cut operation. In this case, a portion requiring accuracy is predetermined as a unit operation, and the unit operations are connected by an air cut operation, whereby a recovery program requiring accuracy can be generated with fewer resources.

The air cut generation unit 312 may generate an air cut operation using the simulation so that the robot 10 does not collide with other objects including the peripheral device 50. In this case, a more reliable recovery program can be generated.

The simulator 300 may further include the interference check unit 314 configured to check on the simulation whether or not the robot 10 will collide with other objects including the peripheral device 50 based on the recovery program generated by the programming unit 313, and the control unit 112 may be configured to operate the robot 10 based on the recovery program confirmed that the interference check unit 314 will not interfere. In this case, the reliability of the recovery program is further improved.

The operation program may include a suspendable point disposed at one or more timings between the plurality of operations of the robot 10, and the suspension unit 113 may be configured to suspend the plurality of operations of the robot 10 at the suspendable point disposed at a timing after the irregular state occurs in the peripheral device 50. In this case, by limiting the state of the robot 10 at the time of suspending the operation to a predetermined suspension point, the influence of the suspension of the operation of the robot 10 on the output of the robot system 1 (production of the workpiece or the like) may be suppressed. Limiting the state of the robot 10 at the time of suspending the operation may facilitate the generation of the recovery program.

At least the simulator 300 may be configured to communicate, via a private network or the Internet, with the control unit 112 disposed on the edge side where the robot 10 and the peripheral device 50 are disposed. In this case, by disposed the simulator 300 on the network, the simulator 300 can be easily shared by a plurality of the control unit 112.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A robot system comprising:
a robot;
a peripheral device disposed around the robot; and
circuitry configured to:
control the robot, based on an operation program, to execute a plurality of sequential operations in conjunction with a process performed on an object by the peripheral device;
cause the robot to suspend the plurality of sequential operations in response to determining that an irregular state has occurred in the peripheral device;
generate a recovery program based, at least in part, on robot state information identifying a state of the robot suspending the plurality of sequential operations, wherein the recovery program includes instructions for controlling the robot to execute one or more additional operations on the object, other than the plurality of sequential operations;

control the robot, based on the recovery program, to execute the one or more additional operations on the object, so that the robot eliminates the irregular state; and cause the robot to resume the plurality of suspended sequential operations, in conjunction with the process performed by the peripheral device, in response to determining that the irregular state has been eliminated.

2. The robot system according to claim 1, wherein the object comprises a workpiece, wherein the plurality of sequential operations include placing the workpiece in the peripheral device, wherein the irregular state includes an irregular placement of the workpiece in the peripheral device, and wherein the circuitry is further configured to execute the additional operations so that the robot repositions the workpiece in the peripheral device.

3. The robot system according to claim 1, wherein the object comprises a tool, wherein the plurality of sequential operations include placing the tool in the peripheral device, wherein the irregular state includes an irregular placement of the tool in the peripheral device, and wherein the circuitry is further configured to execute the additional operations so that the robot repositions the tool in the peripheral device.

4. The robot system according to claim 1, wherein the circuitry is further configured to generate the recovery program using an operational simulation of the robot and the peripheral device based, at least in part, on the robot state information and model information of the robot and the peripheral device.

5. The robot system according to claim 4, wherein the circuitry is further configured to generate the recovery program by:

modifying the model information, based, at least in part, on replicating states of the robot and the peripheral device suspending the plurality of sequential operations; and generating the recovery program using the operational simulation based on the modified model information and irregular state information identifying the irregular state of the peripheral device.

6. The robot system according to claim 5, wherein the circuitry is further configured to:

specify a type of the irregular state based, at least in part, on the irregular state information; and generate the recovery program using the operational simulation based on the modified model information and the type of the irregular state.

7. The robot system according to claim 6, wherein the circuitry is further configured to:

specify a recovery process in the peripheral device in addition to the type of the irregular state based on the irregular state information; and cause the peripheral device to execute the recovery process so that the plurality of suspended sequential operations become resumable.

8. The robot system according to claim 6, wherein the circuitry is further configured to:

generate a tentative recovery program based on the modified model information and the type of the irregular state;

execute the operational simulation of the robot and the peripheral device according to the tentative recovery program; and modify the tentative recovery program based on a result of the operational simulation to generate the recovery program.

9. The robot system according to claim 6, wherein the circuitry is further configured to:

select one or more unit operations from a plurality of unit operations representing predetermined operations of the robot based on the type of the irregular state;

generate one or more transitional operations for starting the one or more unit operations using the operational simulation based on the modified model information and the one or more unit operations; and generate the recovery program based on the one or more unit operations and the one or more transitional operations.

10. The robot system according to claim 9, wherein the circuitry is further configured to select the one or more unit operations based on the type of the irregular state and a program database correlating the plurality of unit operations and a plurality of types of the irregular state.

11. The robot system according to claim 9, wherein the circuitry is further configured to:

select a recovery process from a plurality of predetermined recovery processes in the peripheral device based on the type of the irregular state and a process database correlating the plurality of recovery processes and a plurality of types of the irregular state; and cause the peripheral device to execute the recovery process so that the plurality of suspended sequential operations become resumable.

12. The robot system according to claim 9, wherein the circuitry is further configured to:

generate one or more tentative transitional operations based on the modified model information and the one or more unit operations;

execute the operational simulation of the robot and the peripheral device according to the one or more tentative transitional operations; and modify the tentative transitional operations based on a result of the operational simulation to generate the one or more transitional operations.

13. The robot system according to claim 12, wherein the circuitry is further configured to modify the one or more tentative transitional operations so that the robot does not collide with one or more peripheral objects including the peripheral device during the one or more transitional operations.

14. The robot system according to claim 12, wherein the circuitry is further configured to check whether the robot will collide with one or more peripheral objects including the peripheral device using the operational simulation based on the recovery program and the model information; and control the robot based on the recovery program in response to determining that the robot will not collide with the one or more peripheral objects.

15. The robot system according to claim 1, wherein the operation program includes one or more predetermined suspendable points disposed at one or more timings in the plurality of sequential operations, and wherein the circuitry is further configured to suspend the plurality of sequential operations at one of the one or more predetermined suspendable points disposed at a timing after an occurrence of the irregular state.

16. The robot system according to claim 1, wherein the circuitry comprises:

a first circuitry; and a second circuitry communicable with the first circuitry via a communication network, wherein the first circuitry is configured to:

control the robot, based on the operation program, to execute the plurality of sequential operations in conjunction with the process performed on the object by the peripheral device; and cause the robot to suspend the plurality of sequential operations in response to determining that the irregular state has occurred in the peripheral device, wherein the second circuitry is configured to generate the recovery program based, at least in part, on the robot state information identifying the state of the robot suspending the plurality of sequential operations, and wherein the first circuitry is further configured to:

control the robot to execute the one or more additional operations on the object so that the robot eliminates the irregular state; and cause the robot to resume the plurality of suspended sequential operations, in conjunction with the process performed by the peripheral device, in response to determining that the irregular state has been eliminated.

17. A method for generating a recovery program comprising:

acquiring robot state information identifying a state of the robot that suspends, in response to an irregular state that has occurred in a peripheral device, a plurality of sequential operations performed on an object in conjunction with the peripheral device;

generating a recovery program, based at least in part on the robot state information, wherein the recovery program includes instructions for controlling the robot to execute one or more additional operations on the object, other than the plurality of suspended operations; and transmitting the generated recovery program to cause the robot to execute the one or more additional operations on the object, so that the robot eliminates the irregular state, and to cause the robot to resume the plurality of suspended operations, in conjunction with the peripheral device.

18. A method of robot control using the recovery program generated by the method according to claim 17, wherein the method of robot control comprises:

controlling the robot, based on an operation program, to execute the plurality of sequential operations on the object in conjunction with the peripheral device; and causing the robot to suspend the plurality of sequential operations in response to determining that the irregular state has occurred in the peripheral device, and wherein transmitting the generated recovery program comprises:

controlling the robot, based on the recovery program, to execute the one or more additional operations on the object, so that the robot eliminates the irregular state; and causing the robot to resume the plurality of suspended sequential operations, in conjunction with the peripheral device, in response to determining that the irregular state has been eliminated.

19. A non-transitory memory device having instructions stored thereon that, in response to execution by a processing device, cause the processing device to perform operations comprising:

acquiring robot state information identifying a state of the robot that suspends, in response to an irregular state that has occurred in a peripheral device, a plurality of sequential operations performed on an object in conjunction with the peripheral device, and irregular state information representing the irregular state of the peripheral device;

specifying a type of the irregular state based, at least in part, on the irregular state information;

transmitting the type of the irregular state and the robot state information to generate a recovery program, wherein the recovery program includes instructions for controlling the robot to execute one or more additional operations on the object, other than the plurality of sequential operations;

receiving the generated recovery program; and transmitting the generated recovery program to cause the robot to execute the one or more additional operations on the object, so that the robot eliminates the irregular state, and to cause the robot to resume the plurality of suspended operations, in conjunction with the peripheral device.

20. The non-transitory memory device according to claim 19, wherein the operations further comprise:

controlling the robot, based on an operation program, to execute the plurality of sequential operations on the object in conjunction with the peripheral device; and causing the robot to suspend the plurality of sequential operations in response to determining that the irregular state has occurred in the peripheral device, and wherein transmitting the generated recovery program comprises:

controlling the robot, based on the recovery program, to execute the one or more additional operations on the object, so that the robot eliminates the irregular state; and causing the robot to resume the plurality of suspended sequential operations, in conjunction with the peripheral device, in response to determining that the irregular state has been eliminated.

* * * * *